(12) United States Patent
Lim

(10) Patent No.: US 12,529,788 B2
(45) Date of Patent: Jan. 20, 2026

(54) RADAR DEVICE AND DRIVING METHOD THEREFOR

(71) Applicant: LG INNOTEK CO., LTD., Seoul (KR)

(72) Inventor: Dong Hwan Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 41 days.

(21) Appl. No.: 18/698,903

(22) PCT Filed: Oct. 4, 2022

(86) PCT No.: PCT/KR2022/014894
§ 371 (c)(1),
(2) Date: Apr. 5, 2024

(87) PCT Pub. No.: WO2023/059024
PCT Pub. Date: Apr. 13, 2023

(65) Prior Publication Data
US 2025/0004128 A1    Jan. 2, 2025

(30) Foreign Application Priority Data

Oct. 7, 2021 (KR) .................. 10-2021-0132815
Jan. 4, 2022 (KR) .................. 10-2022-0000729

(51) Int. Cl.
*G01S 13/931* (2020.01)
*G01S 7/03* (2006.01)
*H01Q 1/32* (2006.01)
*H01Q 1/42* (2006.01)

(52) U.S. Cl.
CPC ............ *G01S 13/931* (2013.01); *G01S 7/032* (2013.01); *H01Q 1/3233* (2013.01); *H01Q 1/42* (2013.01)

(58) Field of Classification Search
None
See application file for complete search history.

(56) References Cited

U.S. PATENT DOCUMENTS

| | | | | | |
|---|---|---|---|---|---|
| 4,916,450 | A | * | 4/1990 | Davis | G01S 13/931 342/109 |
| 5,860,715 | A | * | 1/1999 | Lohde | H02B 1/50 D13/184 |
| 10,985,471 | B2 | * | 4/2021 | Shiozaki | H01Q 9/0407 |
| 11,226,397 | B2 | * | 1/2022 | Chen | H01Q 1/3233 |
| 11,342,659 | B2 | * | 5/2022 | Wittmann | H01Q 1/32 |
| 11,552,389 | B2 | * | 1/2023 | Harrer | G01S 7/027 |

(Continued)

FOREIGN PATENT DOCUMENTS

| EP | 2 990 823 A1 | 3/2016 |
|---|---|---|
| JP | 5330538 B2 | 10/2013 |

(Continued)

*Primary Examiner* — Fekadeselassie Girma
(74) *Attorney, Agent, or Firm* — Birch, Stewart, Kolasch & Birch, LLP

(57) ABSTRACT

A radar device according to an embodiment, and a driving method therefor are disclosed. The radar device comprises: an antenna; a radome which is arranged above the antenna and which has a shape that changes by means of an external stimulus; and a driving unit which is connected to at least one side of the radome and which applies the external stimulus to at least one side of the radome according to a predetermined control signal.

20 Claims, 29 Drawing Sheets

(56) References Cited

U.S. PATENT DOCUMENTS

| | | | |
|---|---|---|---|
| 2006/0125705 A1* | 6/2006 | Nagano | H01Q 13/02 |
| | | | 343/785 |
| 2006/0170547 A1* | 8/2006 | Imanishi | A61P 31/04 |
| | | | 340/541 |
| 2007/0182659 A1 | 8/2007 | Devicque et al. | |
| 2007/0229374 A1* | 10/2007 | Shimura | B60C 23/0408 |
| | | | 343/713 |
| 2008/0042851 A1* | 2/2008 | Baba | G06K 19/07728 |
| | | | 257/679 |
| 2008/0252552 A1* | 10/2008 | Goebel | H01Q 1/42 |
| | | | 343/872 |
| 2009/0058739 A1* | 3/2009 | Konishi | H01Q 1/241 |
| | | | 343/702 |
| 2011/0285604 A1 | 11/2011 | Le Bayon et al. | |
| 2012/0235868 A1* | 9/2012 | Oshiro | H01Q 1/243 |
| | | | 343/702 |
| 2014/0028619 A1* | 1/2014 | Huang | G06F 3/0412 |
| | | | 455/575.1 |
| 2014/0159949 A1 | 6/2014 | Mialhe | |
| 2016/0231417 A1* | 8/2016 | Aoki | G01S 7/032 |
| 2017/0207514 A1* | 7/2017 | Kamo | B32B 7/05 |
| 2017/0285163 A1* | 10/2017 | Rieke | H01Q 17/00 |
| 2018/0053992 A1* | 2/2018 | Mizutani | B60R 11/02 |
| 2018/0159211 A1* | 6/2018 | Biancotto | H01Q 1/42 |
| 2019/0207302 A1* | 7/2019 | Yamada | H01Q 15/0013 |
| 2019/0265329 A1* | 8/2019 | Mauch | G01S 7/032 |
| 2019/0379101 A1 | 12/2019 | Reese | |
| 2020/0295452 A1* | 9/2020 | Yamada | G01S 13/931 |

FOREIGN PATENT DOCUMENTS

| | | |
|---|---|---|
| KR | 10-2012-0027985 A | 3/2012 |
| KR | 10-2019-0058072 A | 5/2019 |

* cited by examiner

300

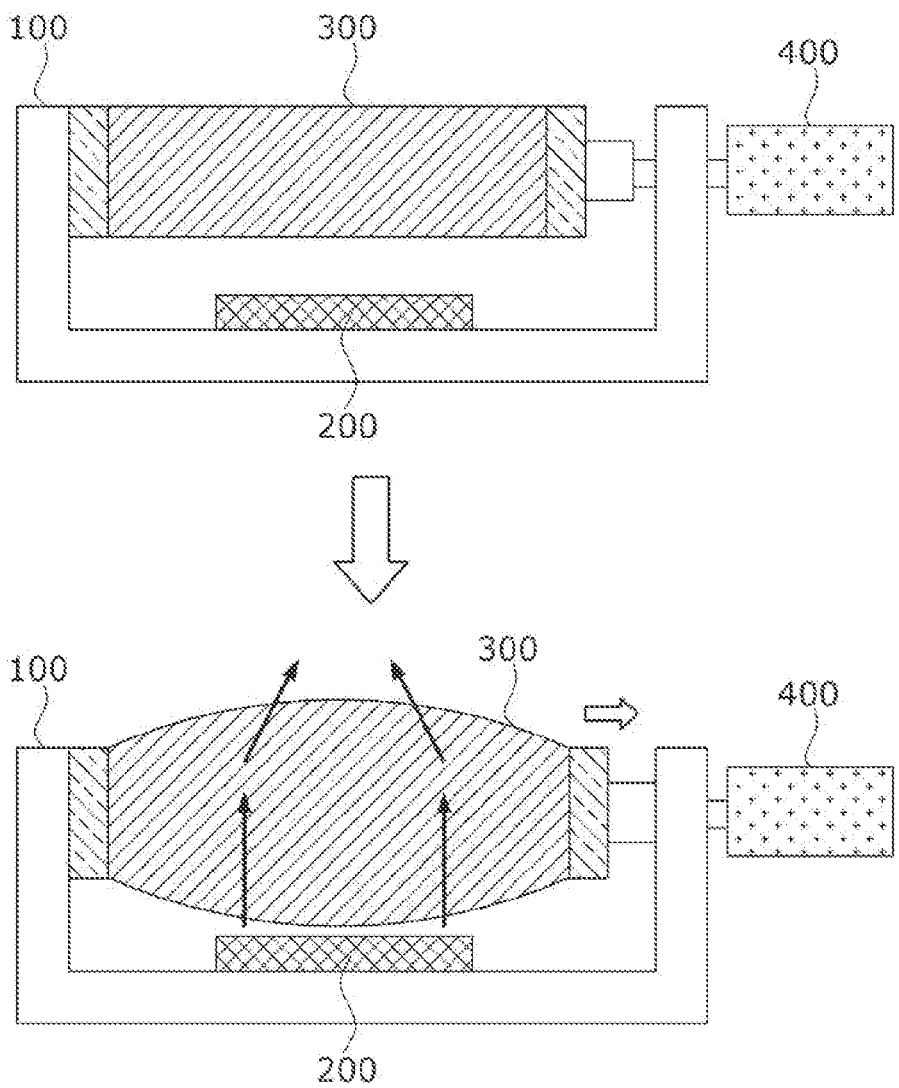

RADAR DEVICE AND DRIVING METHOD THEREFOR

CROSS REFERENCE TO RELATED APPLICATIONS

This application is the National Phase of PCT International Application No. PCT/KR2022/014894, filed on Oct. 4, 2022, which claims priority under 35 U.S.C. 119(a) to Patent Application No. 10-2021-0132815, filed in the Republic of Korea on Oct. 7, 2021, and Patent Application No. 10-2022-0000729, filed in the Republic of Korea on Jan. 4, 2022, all of which are hereby expressly incorporated by reference into the present application.

TECHNICAL FIELD

Embodiments relate to a radar device which can be used by being mounted in a vehicle, and a method of driving the same.

BACKGROUND ART

In general, radar devices may detect or track a distance, speed, and angle of a target device through transmission and reception of radio waves. These radar devices include an antenna for transmitting and receiving electromagnetic waves, internal electronic components, and a radome for protecting the internal electronic components. Electromagnetic waves are radiated from the antenna, and the radiated electromagnetic waves are radiated by passing through the radome.

Since such a radome has a fixed shape in a flat configuration, the radome does not affect a field of view (FOV) of the antenna. In other words, since the radome cannot actively change the FOV due to the fixed shape, the radome always has a constant resolution, making focusing or enlarging impossible. Therefore, there is a need for a new radar capable of actively adjusting a sensing area.

DISCLOSURE

Technical Problem

Embodiments may provide a radar device capable of actively adjusting a field of view (FOV), and a method of driving the same.

Technical Solution

A radar device according to an embodiment may include an antenna, a radome disposed above the antenna and having a shape changed by an external stimulus, and a driving unit connected to at least one side of the radome and configured to apply the external stimulus to the at least one side of the radome according to a predetermined control signal.

Advantageous Effects

According to the embodiments, by forming the radome with an auxetic material and expanding or shrinking the radome by applying a predetermined stimulus to be transformed into a form of a convex lens or a concave lens, the sensing area can be changed to actively adjust the FOV.

According to the embodiments, by allowing a fluid to flow into or be discharged from the inner space of the radome for an external stimulus to expand or shrink the radome, the sensing area can be changed to actively adjust the FOV.

According to the embodiments, since the sensing area can be changed by expanding or shrinking the radome according to surrounding situations, it is possible to actively check the surrounding situations.

According to the embodiments, since the sensing area can be changed, it is possible to reduce the number of radar devices used, thereby reducing costs and efficiently using the space.

DESCRIPTION OF DRAWINGS

FIGS. 4A and 4B are views for describing an operation principle of a radar device according to a first embodiment.

MODE FOR INVENTION

Figure 1:
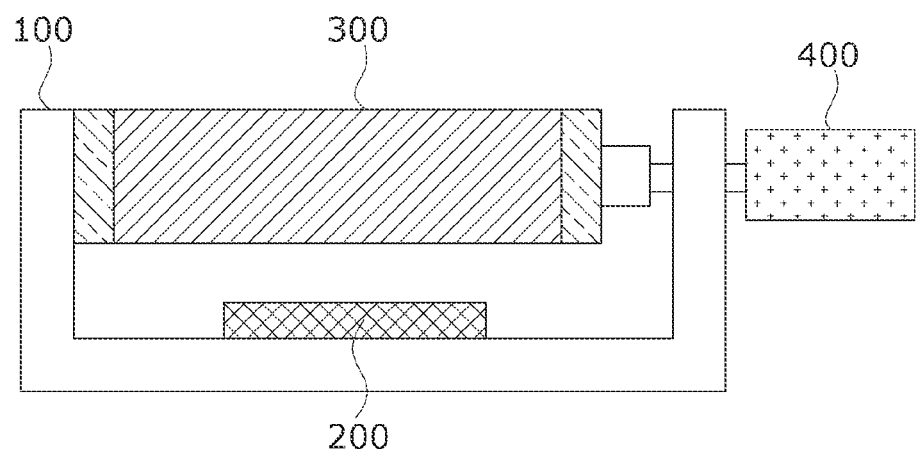
FIG. 1 is a view showing a radar device according to a first embodiment of the present invention.

Hereinafter, exemplary embodiments according to the present invention will be described in detail with reference to the accompanying drawings.

However, the technical spirit of the present invention is not limited to some of the described embodiments, but may be implemented in various different forms, and one or more of the components among the embodiments may be used by being selectively coupled or substituted without departing from the scope of the technical spirit of the present invention.

In addition, terms (including technical and scientific terms) used in embodiments of the present invention may be construed as meaning that may be generally understood by those skilled in the art to which the present invention pertains unless explicitly specifically defined and described, and the meanings of the commonly used terms, such as terms defined in a dictionary, may be construed in consideration of contextual meanings of related technologies.

In addition, the terms used in the embodiments of the present invention are for describing the embodiments and are not intended to limit the present invention.

In the specification, a singular form may include a plural form unless otherwise specified in the phrase, and when described as "at least one (or one or more) of A, B, and C," one or more among all possible combinations of A, B, and C may be included.

In addition, terms such as first, second, A, B, (a), and (b) may be used to describe components of the embodiments of the present invention.

These terms are only for the purpose of distinguishing one component from another component, and the nature, sequence, order, or the like of the corresponding components is not limited by these terms.

In addition, when a first component is described as being "connected," "coupled," or "joined" to a second component, it may include a case in which the first component is directly connected, coupled, or joined to the second component, but also a case in which the first component is "connected." "coupled," or "joined" to the second component by other components present between the first component and the second component.

In addition, when the first component is described as being formed or disposed on "on (above) or below (under)" the second component, "on (above)" or "below (under)" may include not only a case in which two components are in direct contact with each other, but also a case in which one or more third components are formed or disposed between the two components. In addition, when described as "on (above) or below (under)," it may include the meaning of not only an upward direction but also a downward direction based on one component.

A radar device according to an embodiment includes an antenna and a radome for protecting the antenna and may detect or track a distance, speed, angle, and the like of a target by transmitting and receiving electromagnetic waves. The radar device can be used by being applied to a vehicle, and for example, used to detect objects around the vehicle but is not necessarily limited thereto. As another example, the radar device may be mounted inside a vehicle and used to detect whether a person has gotten on in an inner space or detect the breathing of a person in a specific space.

In embodiments below, a radome is made of an auxetic material and is transformed into a form of a convex lens or a concave lens by applying a predetermined stimulus to expand or shrink the radome. Here, the auxetic material indicates a material having a specific structure with a negative Poisson's ratio and Poisson number and is also referred to as a meta material.

FIG. 1 is a view showing a radar device according to a first embodiment of the present invention.

Referring to FIG. 1, the radar device according to the first embodiment of the present invention may include a housing 100, an antenna 200, a radome 300, and a driving unit 400.

The housing 100 may have a shape in which the antenna 200 may be accommodated and have an open upper surface. The antenna 200 may be fixedly disposed on an inner bottom surface of the housing 100.

The antenna 200 may be disposed on the inner bottom surface of the housing 100 and may radiate or receive electromagnetic waves. Although not shown, the antenna 200 may include a board and a radiation pattern. The board may be, for example, a printed circuit board (PCB). The radiation pattern may be formed on one surface of the board and formed in any of various shapes for radiating electromagnetic waves.

The antenna 200 may include not only one radiation pattern but also a plurality of radiation patterns. The antenna 200 may include an antenna array including at least one antenna.

The radome 300 may be disposed above the antenna 200 and may have a shape changed by an external stimulus. The radome 300 may be transformed into a shape in which a field of view (FOV) may be adjusted to increase or decrease according to situations, for example, a convex lens shape or a concave lens shape.

FIGS. 2A to 2E are views for describing a shape and operation principle of the radome shown in FIG. 1.

Figure 2A:
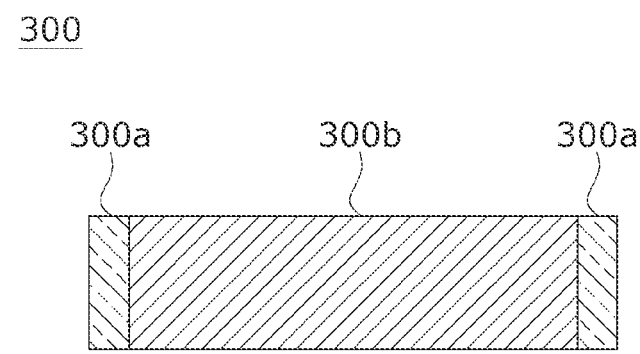
FIGS. 2A to 2E are views for describing a shape and operation principle of the radome shown in FIG. 1.

Referring to FIG. 2A, the radome 300 according to the embodiment is a component for adjusting a sensing area by changing a focus of the antenna 200 and may include a fixing part 300a and a transformable part 300b.

Figure 2B:
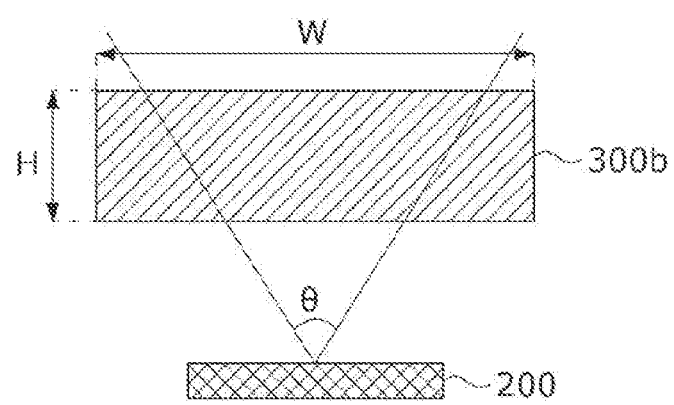

Referring to FIG. 2B, the transformable part 300b may be made of an auxetic material with a predetermined length W and height H. A length of the transformable part 300b may be formed to be greater than a radiation angle of the antenna.

Even when the transformable part 300b is transformed and has a changed length, the transformable part 300b can be designed to be greater than the radiation angle of the antenna.

Figure 2C:
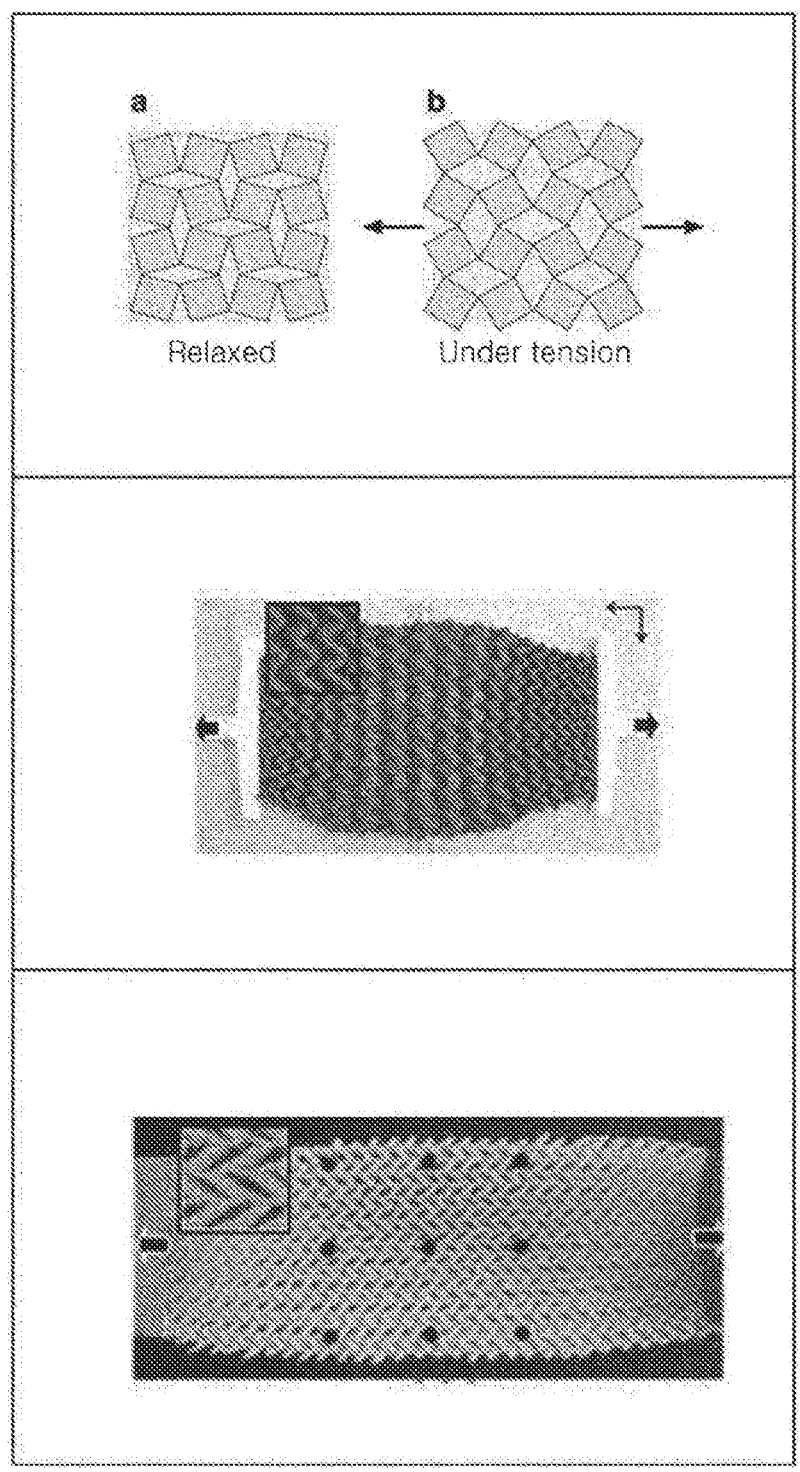

Referring to FIG. 2C, both sides of the transformable part 300b may be coupled to the fixing part 300a so that a shape of the transformable part 300b is transformed by a predetermined force.

The auxetic material has a structure which swells when pulled to both sides. The degree to which the auxetic material swells may be changed depending on a force of pulling the auxetic material to both sides.

Figure 2D:
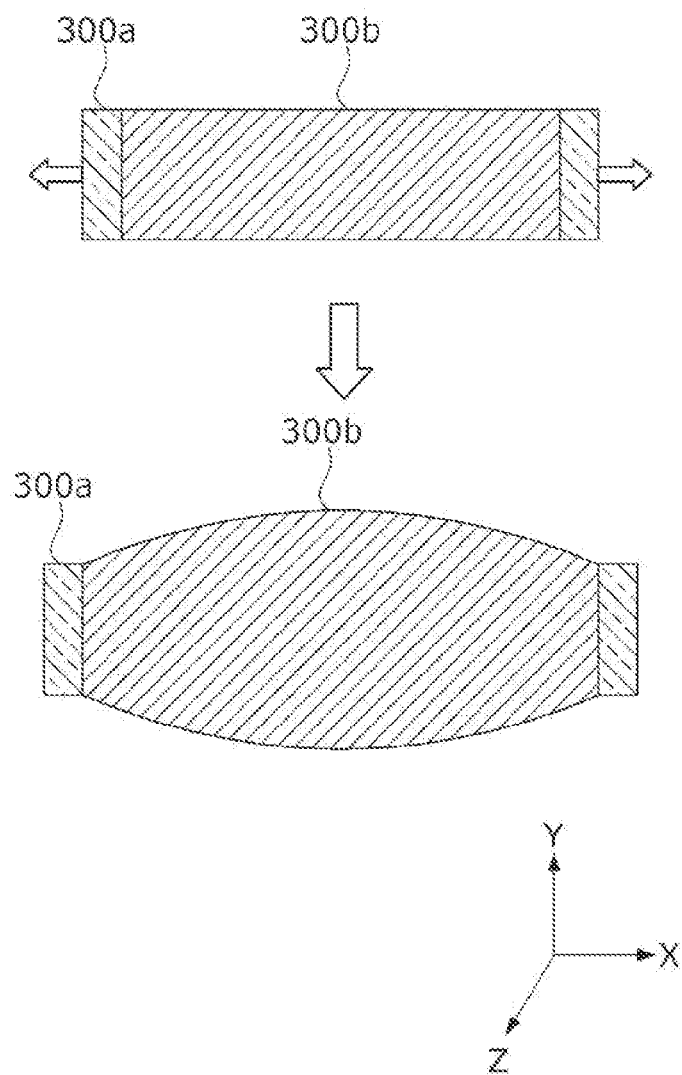

Referring to FIG. 2D, the transformable portion 300b may be transformed into a convex lens shape because it has a predetermined width and height and then expands when the force of pulling to both sides acts.

When a pulling force is applied to the fixing part 300a by driving the driving unit according to a control signal for focusing on a narrow area while sensing a predetermined reference area, as the fixing part 300a moves in a first axis direction according to the force of pulling to both sides, the transformable part 300b coupled to the fixing part 300a may expand in a second axis direction perpendicular to the first axis direction while also expanding in the first axis direction. In other words, an inner surface of the transformable part 300b may expand toward the antenna, and an outer surface thereof may expand in a direction opposite to the antenna to be transformed into the convex lens shape.

In this case, the first axis direction may be an X-axis direction, and the second axis direction may be a Y-axis direction.

Figure 2E:
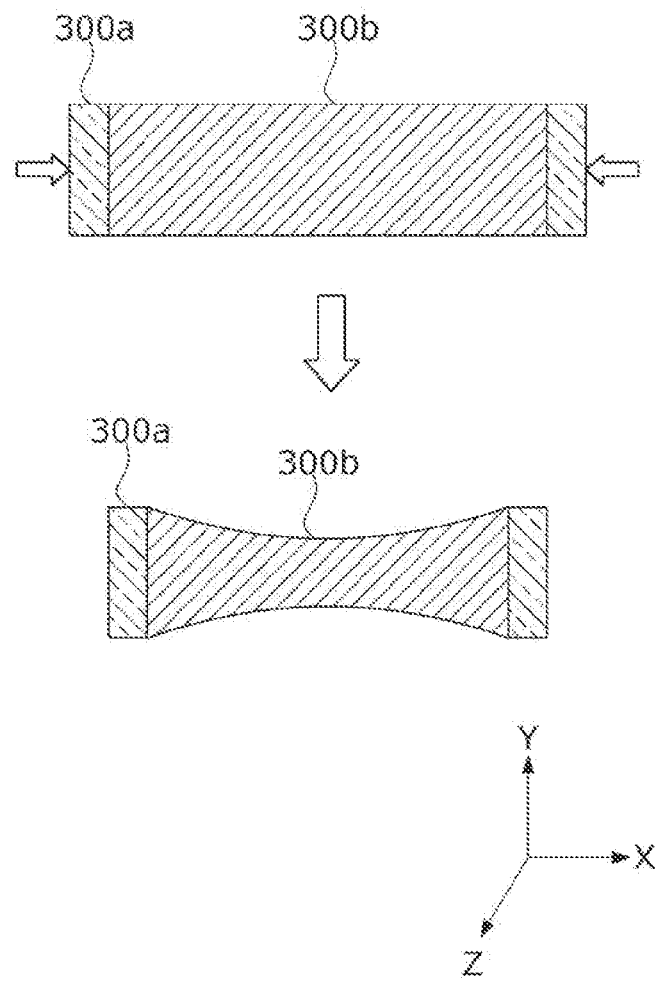

Referring to FIG. 2E, the transformable part 300b may be transformed into a concave lens shape because it has the predetermined width and height and then shrinks when the force of pushing from both sides acts.

When a pushing force is applied to the fixing part 300a by driving the driving unit according to a control signal for expanding to a wide area while sensing the predetermined reference area, as the fixing part 300a moves in the first axis direction according to the force of pushing from both sides, the transformable part 300b coupled to the fixing part 300a may shrink in the second axis direction perpendicular to the first axis direction while also shrinking in the first axis direction. In other words, the inner surface of the transformable part 300b may shrink toward the antenna, and the outer surface thereof may shrink in the direction opposite to the antenna to be transformed into the concave lens shape.

Figure 3:
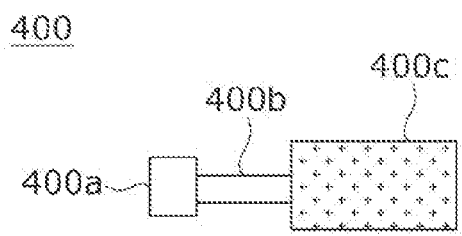
FIG. 3 is a view showing a specific configuration of a driving unit shown in FIG. 1.

FIG. 3 is a view showing a specific configuration of a driving unit shown in FIG. 1.

Referring to FIG. 3, the driving unit 400 according to the embodiment is a means for providing stimulus to the radome and may include a coupling unit 400a, a moving unit 400b, and an actuator 400c.

The coupling part 400a may be coupled to the radome 300 to apply a predetermined force to the radome 300.

The moving unit 400b may be coupled to the coupling part 400a and may coaxially move in the first direction or the second direction opposite to the first direction. As the moving unit 400b moves, the coupling part 400a may also move.

In this case, the moving unit 400b can be implemented as a gear, for example, a worm gear. The gear can be classified into several types, such as screw gears, spur gears, worm gears, helical gears, bevel gears, rack and pinions, according to the state relationship between the two axes which transmit rotational motion. In an embodiment, although a case of using the worm gear is described as an example, the present invention is not necessarily limited thereto and any of various gears can be used.

In addition, the coupling part 400a may include a nut to be coupled to the moving unit 400b.

The actuator 400c may be coupled to the moving unit 400b and may coaxially and linearly move the moving unit 400b. The actuator 400c may include, for example, a motor.

Figure 4B:
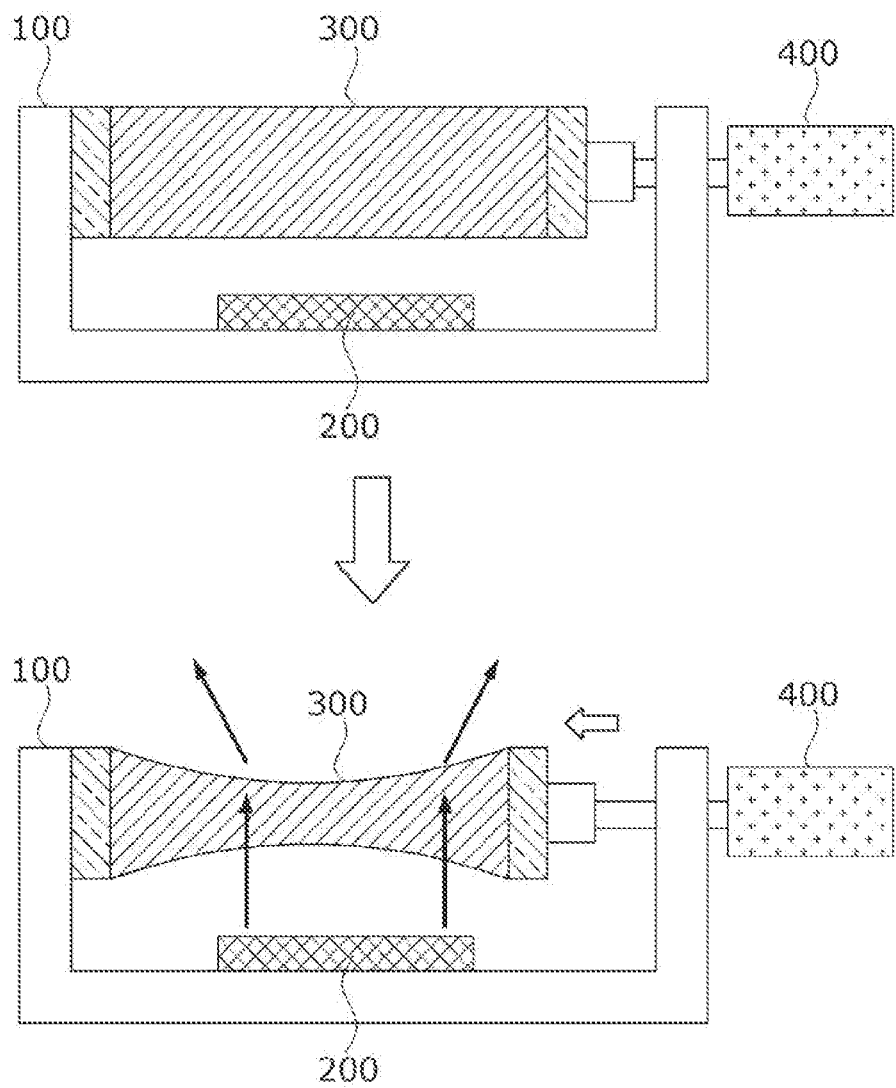

FIGS. 4A and 4B are views for describing an operation principle of a radar device according to a first embodiment.

Referring to FIG. 4A, in the radar device according to the first embodiment, when the pulling force is applied to one side of the radome by driving the driving unit according to the control signal for focusing on the narrow area while sensing the predetermined reference area, the radome may be transformed into the convex lens shape because it expands due to an increase in length.

For example, when a situation in which a specific area needs to be focused while sensing the predetermined reference area occurs, the radar device may transform the radome into the convex lens shape.

Referring to FIG. 4B, in the radar device according to the first embodiment, when the pushing force is applied to the one side of the radome by driving the driving unit according to the control signal for expanding to the wide area while sensing the predetermined reference area, the radome may be transformed into the concave lens shape because it shrinks due to a decrease in length.

For example, when a situation in which the wide area needs to be focused broadly while sensing the predetermined reference area occurs, the radar device may transform the radome into the concave lens shape.

Figure 5:
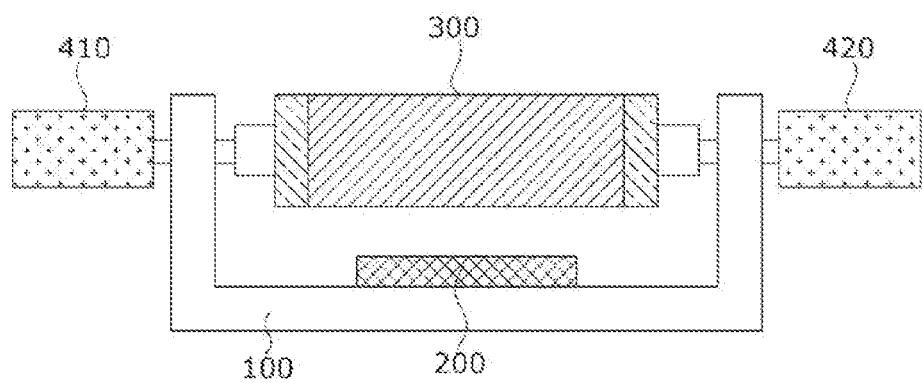
FIG. 5 is a view showing a radar device according to a second embodiment of the present invention.

FIG. 5 is a view showing a radar device according to a second embodiment of the present invention.

Referring to FIG. 5, the radar device according to the second embodiment of the present invention may include the housing 100, the antenna 200, the radome 300, a first driving unit 410, and a second driving unit 420.

Since the configuration and operation except that the driving unit of the radar device according to the first embodiment shown in FIG. 1 is configured as two driving units are the same as those of the radar device according to the first embodiment, detailed description thereof will be omitted.

Here, the reason why the driving unit is configured as two driving units is to match the center of the antenna with the center of the radome. In other words, in the radar device according to the first embodiment shown in FIG. 1, since one side of the radome is fixed to the housing and a predetermined force may be applied to only the other side, the center of the radome does not match with the center of the antenna due to movement when the radome shrinks or expands.

Even when the first driving unit 410 is coupled to the one side of the radome 300, the second driving unit 420 is coupled to the other side of the radome 300, and the same stimulus is applied to the both sides to transform the radome 300, the center of the radome 300 does not move and thus always matches with the center of the antenna 200.

Therefore, the radar device according to the second embodiment can accurately sense the reference area.

Figure 6A:
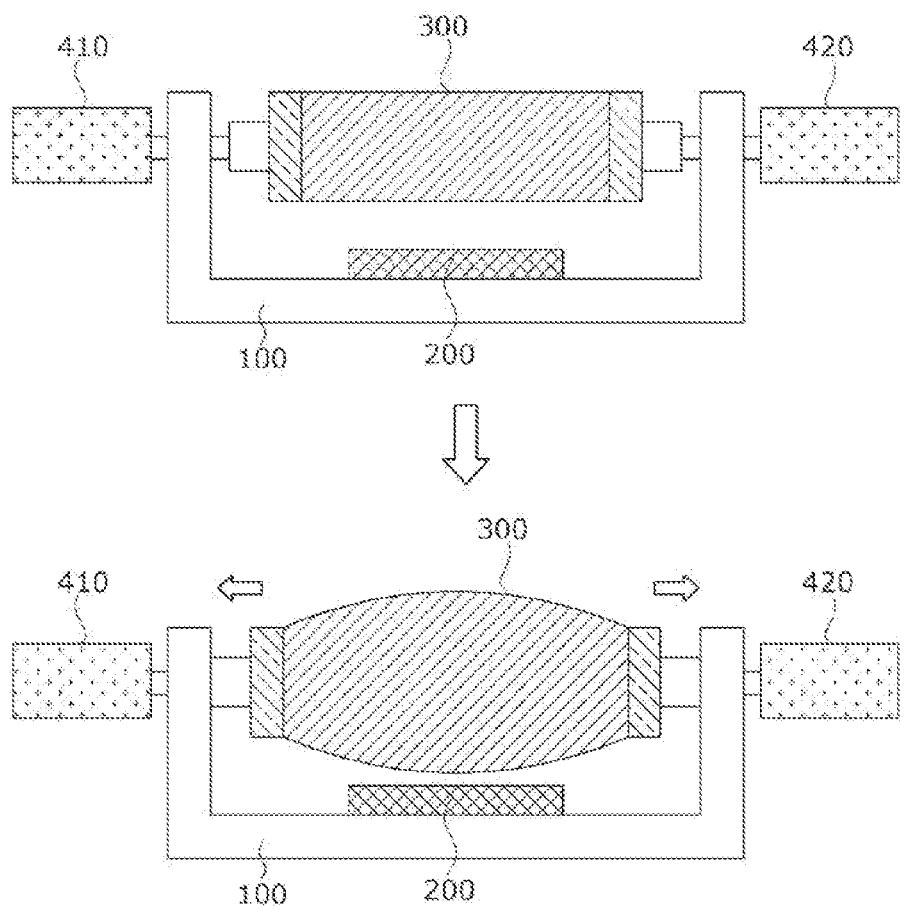
FIGS. 6A and 6B are views for describing an operation principle of the radar device according to the second embodiment.
Figure 6B:
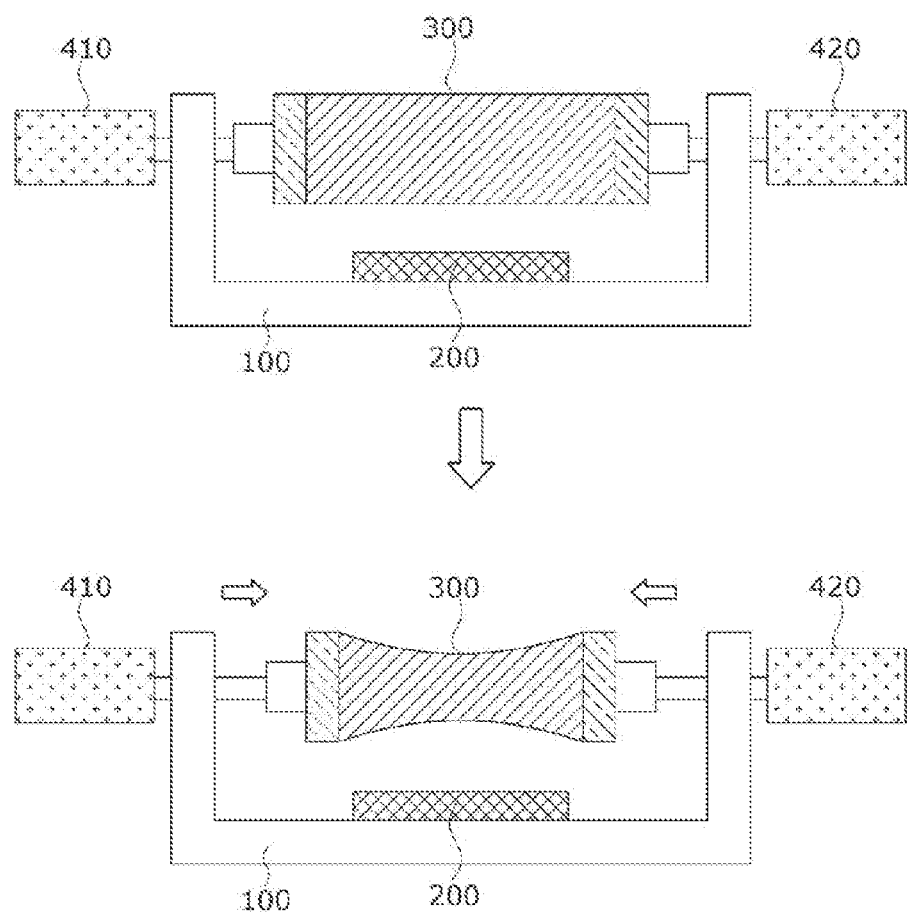

FIGS. 6A and 6B are views for describing an operation principle of the radar device according to the second embodiment.

Referring to FIG. 6A, in the radar device according to the second embodiment, when the pulling force is applied to both sides of the radome 300 by driving the first driving unit 410 and the second driving unit 420 according to the control signal for focusing on the narrow area while sensing the predetermined reference area, the radome 300 may be transformed into the convex lens shape because it expands due to an increase in length.

Referring to FIG. 6B, in the radar device according to the second embodiment, when the pushing force is applied to the both sides of the radome 300 by driving the first driving unit 410 and the second driving unit 420 according to the control signal for expanding to the wide area while sensing the predetermined reference area, the radome 300 may be transformed into the concave lens shape because it shrinks due to a decrease in length.

Figure 7:
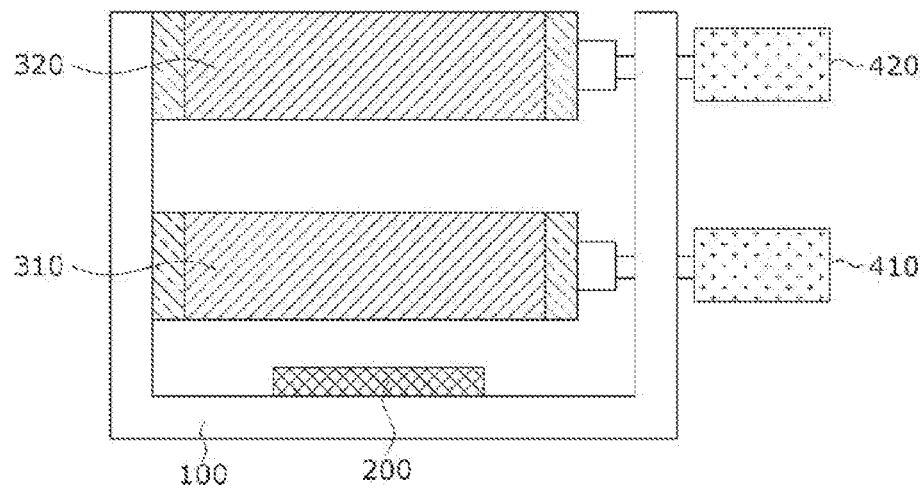
FIG. 7 is a view showing a radar device according to a third embodiment of the present invention.

FIG. 7 is a view showing a radar device according to a third embodiment of the present invention.

Referring to FIG. 7, the radar device according to the third embodiment of the present invention may include the housing 100, the antenna 200, a first radome 310, a second radome 320, the first driving unit 410, and the second driving unit 420.

Since the configuration and operation except that the radome and the driving unit of the radar device according to the first embodiment shown in FIG. 1 are configured in two pairs are the same as those of the radar device according to the first embodiment, detailed description thereof will be omitted.

The first radome 310 and the second radome 320 are disposed side by side in a vertical direction.

The first driving unit 410 may be coupled to one side of the first radome 310 to apply a predetermined stimulus to the first radome 310, and the second driving unit 420 may be coupled to the one side of the second radome 320 to apply a predetermined stimulus to the second radome 320. The first driving unit 410 and the first radome 310, and the second driving unit 420 and the second radome 320 may be driven independently.

FIGS. 8A to 8F are views for describing an operation principle of the radar device according to the third embodiment.

Figure 8A:
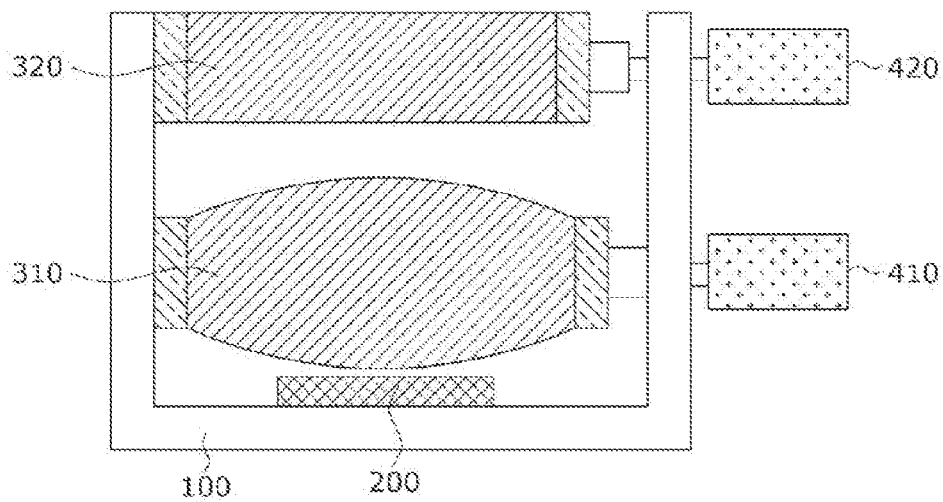
FIGS. 8A to 8F are views for describing an operation principle of the radar device according to the third embodiment.

Referring to FIG. 8A, in the radar device according to the third embodiment, when the pulling force is applied to one side of the radome 310 by driving the first driving unit 410, the first radome 310 may be transformed into the convex lens shape because it expands due to an increase in length.

At this time, the second driving unit 420 is not driven and can maintain an original state as it is.

Conversely, the radar device according to the third embodiment may drive the second driving unit 420 without driving the first driving unit 410.

Figure 8B:
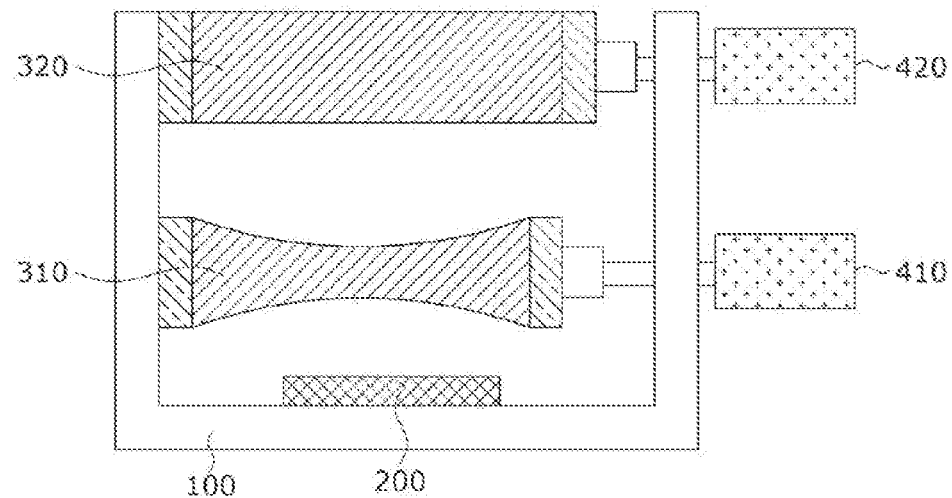

Referring to FIG. 8B, in the radar device according to the third embodiment, when the pulling force is applied to the one side of the first radome 310 by driving the first driving unit 410, the first radome 310 may be transformed into the concave lens shape because it shrinks due to a decrease in length.

At this time, the second driving unit 420 is not driven and can maintain an original state as it is.

Conversely, the radar device according to the third embodiment may drive the second driving unit 420 without driving the first driving unit 410.

Figure 8C:
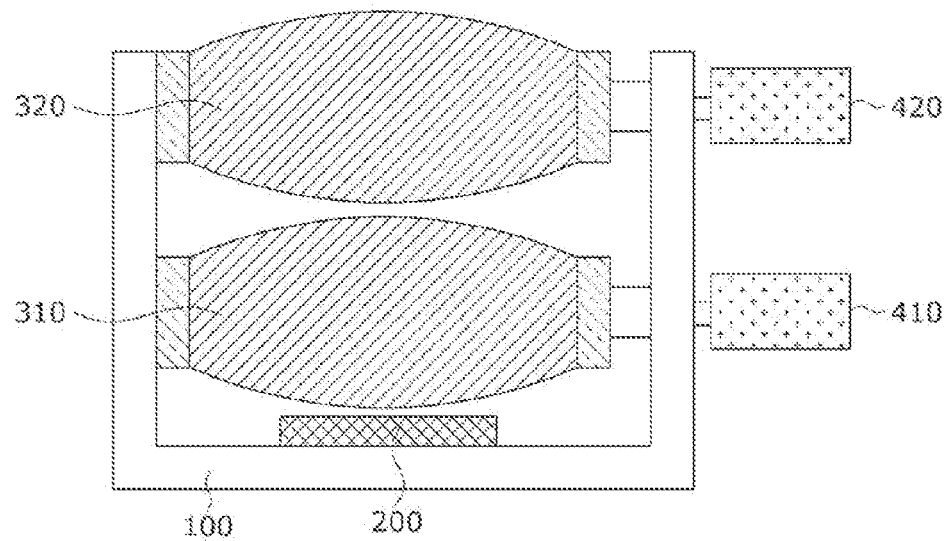

Referring to FIG. 8C, in the radar device according to the third embodiment, when the pulling force is applied to the one side of the first radome 310 by driving the first driving unit 410, the first radome 310 may be transformed into the convex lens shape because it expands due to an increase in length.

At the same time, when the pulling force is applied to one side of the second radome 320 by driving the second driving unit 420, the second radome 320 may be transformed into the convex lens shape because it expands due to an increase in length.

Figure 8D:
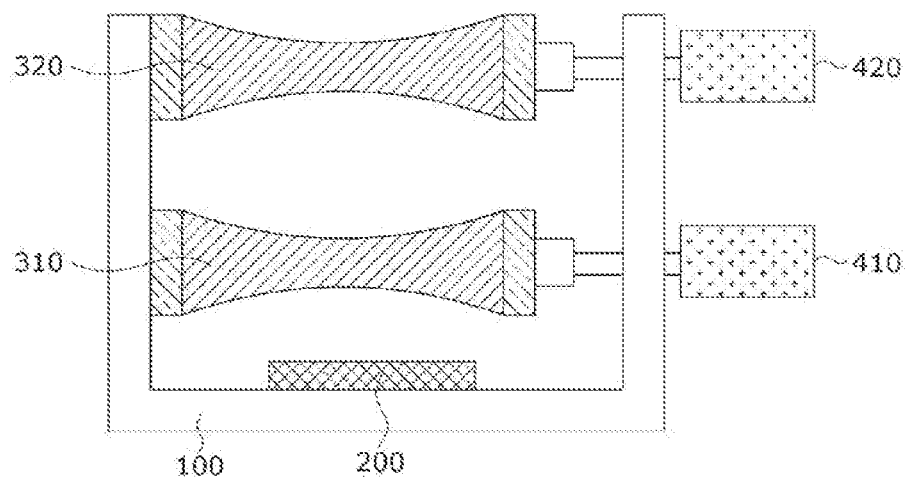

Referring to FIG. 8D, in the radar device according to the third embodiment, when the pulling force is applied to the one side of the first radome 310 by driving the first driving unit 410, the first radome 310 may be transformed into the concave lens shape because it shrinks due to a decrease in length.

At the same time, when the pulling force is applied to the one side of the second radome 320 by driving the second driving unit 420, the second radome 320 may be transformed into the concave lens shape because it shrinks due to a decrease in length.

Figure 8E:
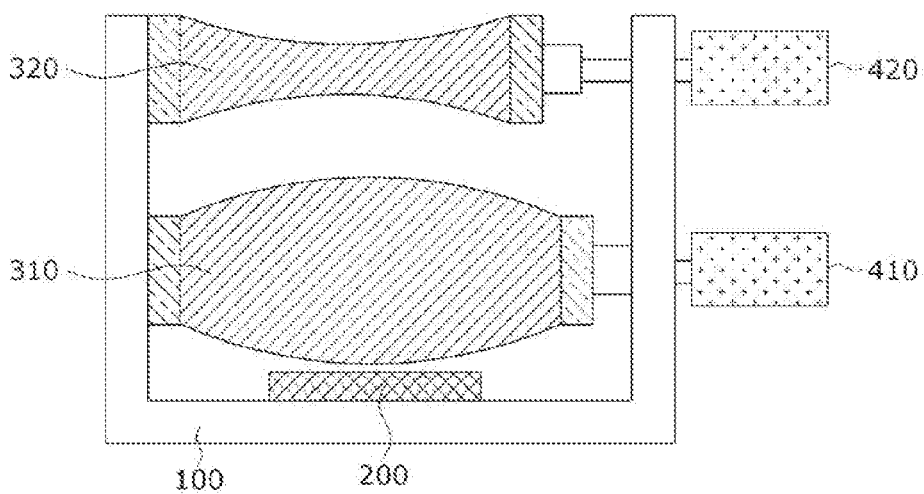

Referring to FIG. 8E, in the radar device according to the third embodiment, when the pulling force is applied to the one side of the first radome 310 by driving the first driving unit 410, the first radome 310 may be transformed into the convex lens shape because it expands due to an increase in length.

At the same time, when the pulling force is applied to the one side of the second radome 320 by driving the second driving unit 420, the second radome 320 may be transformed into the concave lens shape because it shrinks due to a decrease in length.

Figure 8F:
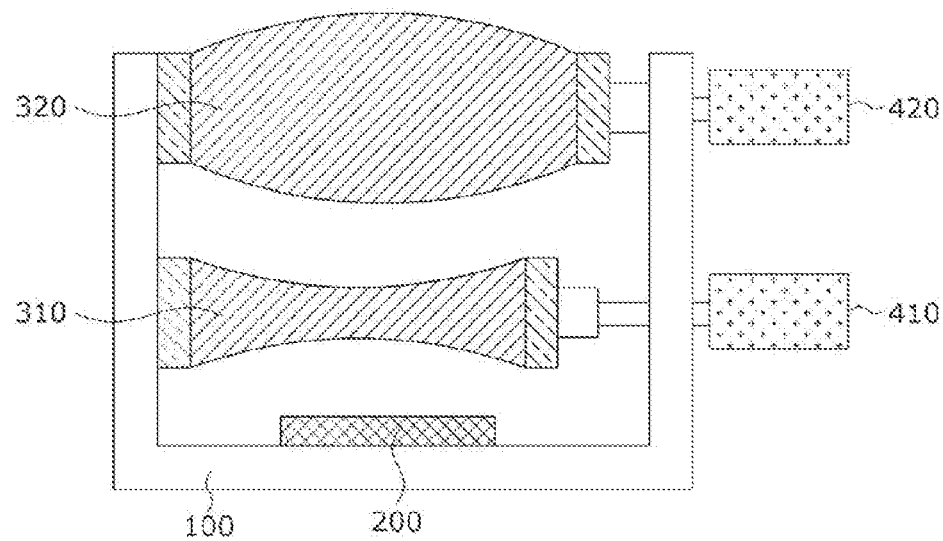

Referring to FIG. 8F, in the radar device according to the third embodiment, when the pulling force is applied to the one side of the first radome 310 by driving the first driving unit 410, the first radome 310 may be transformed into the concave lens shape because it shrinks due to a decrease in length.

At the same time, when the pulling force is applied to one side of the second radome 320 by driving the second driving unit 420, the second radome 320 may be transformed into the convex lens shape because it expands due to an increase in length.

As described above, it is possible to provide the radar device which satisfies various FOV through the first driving unit 410 and the second driving unit 420 driven independently.

Figure 9:
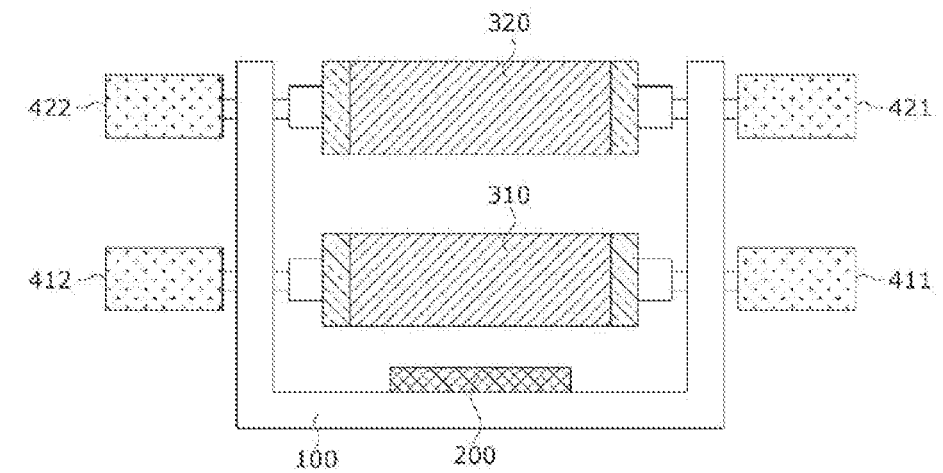
FIG. 9 is a view showing a radar device according to a fourth embodiment of the present invention.

FIG. 9 is a view showing a radar device according to a fourth embodiment of the present invention.

Referring to FIG. 9, the radar device according to the third embodiment of the present invention may include the housing 100, the antenna 200, the first radome 310, the second radome 320, a 1-1 driving unit 411, a 1-2 driving unit 412, and a 2-2 driving unit 422.

Since the configuration and operation except that the radome and the driving unit of the radar device according to the second embodiment shown in FIG. 5 are configured in two pairs are the same as those of the radar device according to the second embodiment, detailed description thereof will be omitted.

The first radome 310 and the second radome 320 are disposed side by side in the vertical direction.

The 1-1 driving unit 411 and the 1-2 driving unit 412 may be respectively coupled to both sides of the first radome 310 to apply a predetermined stimulus to the both sides of the first radome 310, and the 2-1 driving unit 421 and the 2-2 driving unit 422 may be respectively coupled to both sides of the second radome 320 to apply a predetermined stimulus to the both sides of the second radome 320.

The 1-1 driving unit 411, the 1-2 driving unit 412 and the first radome 310, and the 2-1 driving unit 421, the 2-2 driving unit 422, and the second radome 320 may be driven independently.

FIGS. 10A to 10F are views for describing an operation principle of the radar device according to the fourth embodiment.

Figure 10A:
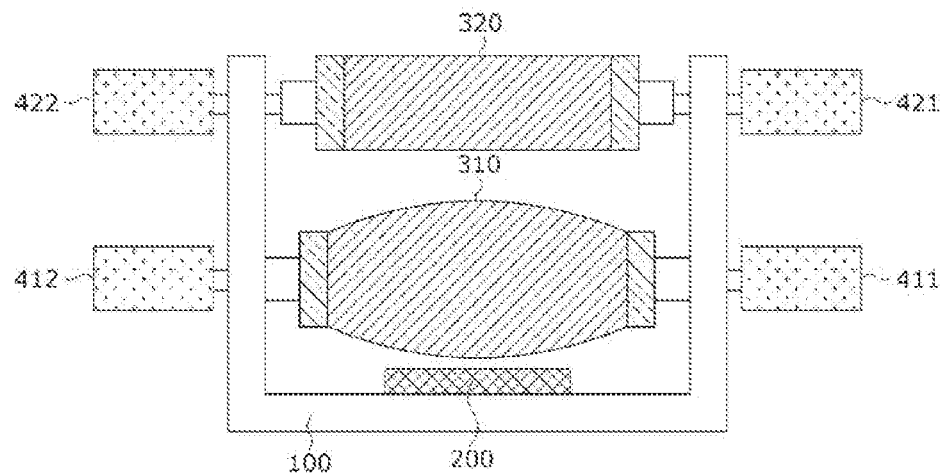
FIGS. 10A to 10F are views for describing an operation principle of the radar device according to the fourth embodiment.

Referring to FIG. 10A, in the radar device according to the fourth embodiment, when the pulling force is applied to the both sides of the first radome 310 by driving the 1-1 driving unit 411 and the 1-2 driving unit 412, the first radome 310 may be transformed into the convex lens shape because it expands due to an increase in length.

At this time, the 2-1 driving unit 421 and the 2-2 driving unit 422 are not driven and can maintain original states as it is.

Conversely, the radar device according to the fourth embodiment may drive the 2-1 driving unit 421 and the 2-2 driving unit 422 without driving the 1-1 driving unit 411 and the 1-2 driving unit 412.

Figure 10B:
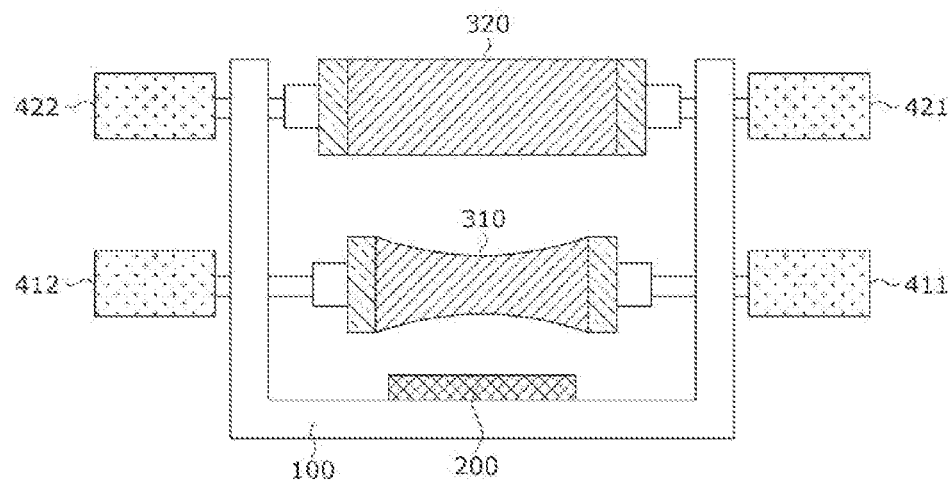

Referring to FIG. 10B, in the radar device according to the fourth embodiment, when the pushing force is applied to the both sides of the first radome 310 by driving the 1-1 driving unit 411 and the 1-2 driving unit 412, the first radome 310 may be transformed into the concave lens shape because it shrinks due to a decrease in length.

At this time, the 2-1 driving unit 421 and the 2-2 driving unit 422 are not driven and can maintain original states as it is.

Conversely, the radar device according to the fourth embodiment may drive the 2-1 driving unit 421 and the 2-2 driving unit 422 without driving the 1-1 driving unit 411 and the 1-2 driving unit 412.

Figure 10C:
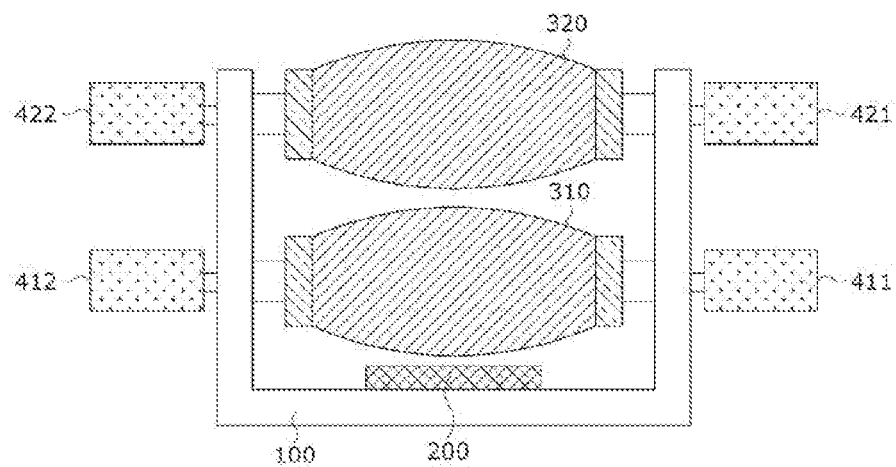

Referring to FIG. 10C, in the radar device according to the fourth embodiment, when the pulling force is applied to the both sides of the first radome 310 by driving the 1-1 driving unit 411 and the 1-2 driving unit 412, the first radome 310 may be transformed into the convex lens shape because it expands due to an increase in length.

At the same time, when the pulling force is applied to the both sides of the second radome 320 by driving the 2-1 driving unit 421 and the 2-2 driving unit 422, the second radome 320 may be transformed into the convex lens shape because it expands due to an increase in length.

Figure 10D:
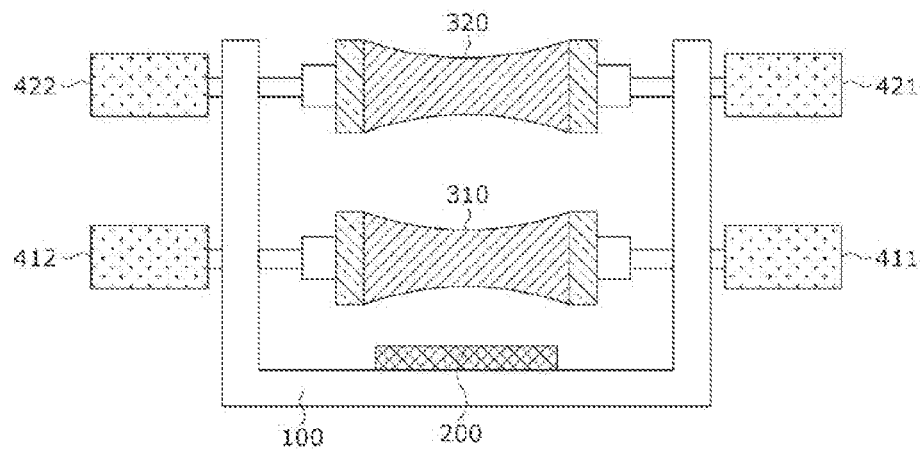

Referring to FIG. 10D, in the radar device according to the fourth embodiment, when the pushing force is applied to the both sides of the first radome 310 by driving the 1-1 driving unit 411 and the 1-2 driving unit 412, the first radome 310 may be transformed into the concave lens shape because it shrinks due to a decrease in length.

At the same time, when the pushing force is applied to the both sides of the second radome 320 by driving the 2-1 driving unit 421 and the 2-2 driving unit 422, the second radome 320 may be transformed into the concave lens shape because it shrinks due to a decrease in length.

Figure 10E:
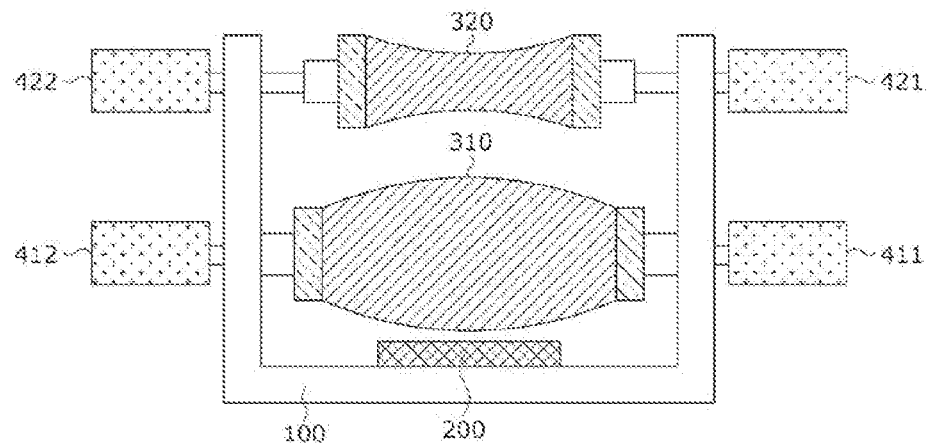

Referring to FIG. 10E, in the radar device according to the fourth embodiment, when the pulling force is applied to the both sides of the first radome 310 by driving the 1-1 driving unit 411 and the 1-2 driving unit 412, the first radome 310 may be transformed into the convex lens shape because it expands due to an increase in length.

At the same time, when the pushing force is applied to the both sides of the second radome 320 by driving the 2-1 driving unit 421 and the 2-2 driving unit 422, the second radome 320 may be transformed into the concave lens shape because it shrinks due to a decrease in length.

Figure 10F:
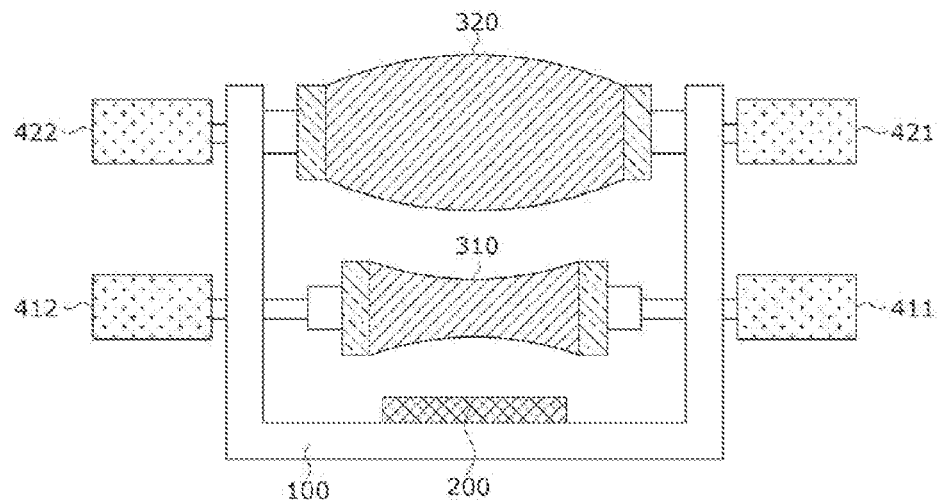

Referring to FIG. 10F, in the radar device according to the fourth embodiment, when the pushing force is applied to the both sides of the first radome 310 by driving the 1-1 driving unit 411 and the 1-2 driving unit 412, the first radome 310 may be transformed into the concave lens shape because it shrinks due to a decrease in length.

At the same time, when the pulling force is applied to the both sides of the second radome 320 by driving the 2-1 driving unit 421 and the 2-2 driving unit 422, the second radome 320 may be transformed into the convex lens shape because it expands due to an increase in length.

Here, although a case in which two radomes are disposed in the vertical direction is described as an example, the present invention is not necessarily limited thereto, and if necessary, three or more radomes can be used.

In embodiments below, the radome expands or shrinks by inputting or taking out a liquid with a dielectric constant required for radar performance for an external stimulus to be transformed into the convex lens shape or the concave lens shape.

Figure 11A:
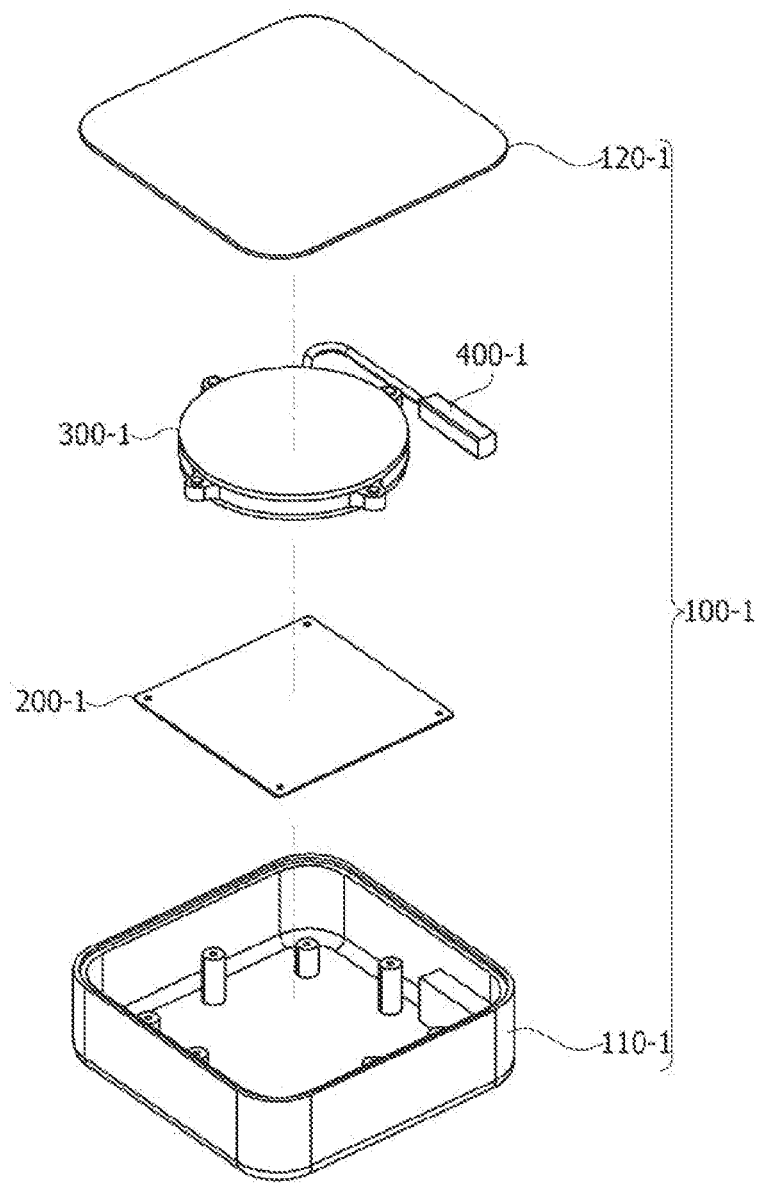
FIGS. 11A and 11B are exploded perspective views showing a radar device according to a fifth embodiment of the present invention.
Figure 11B:
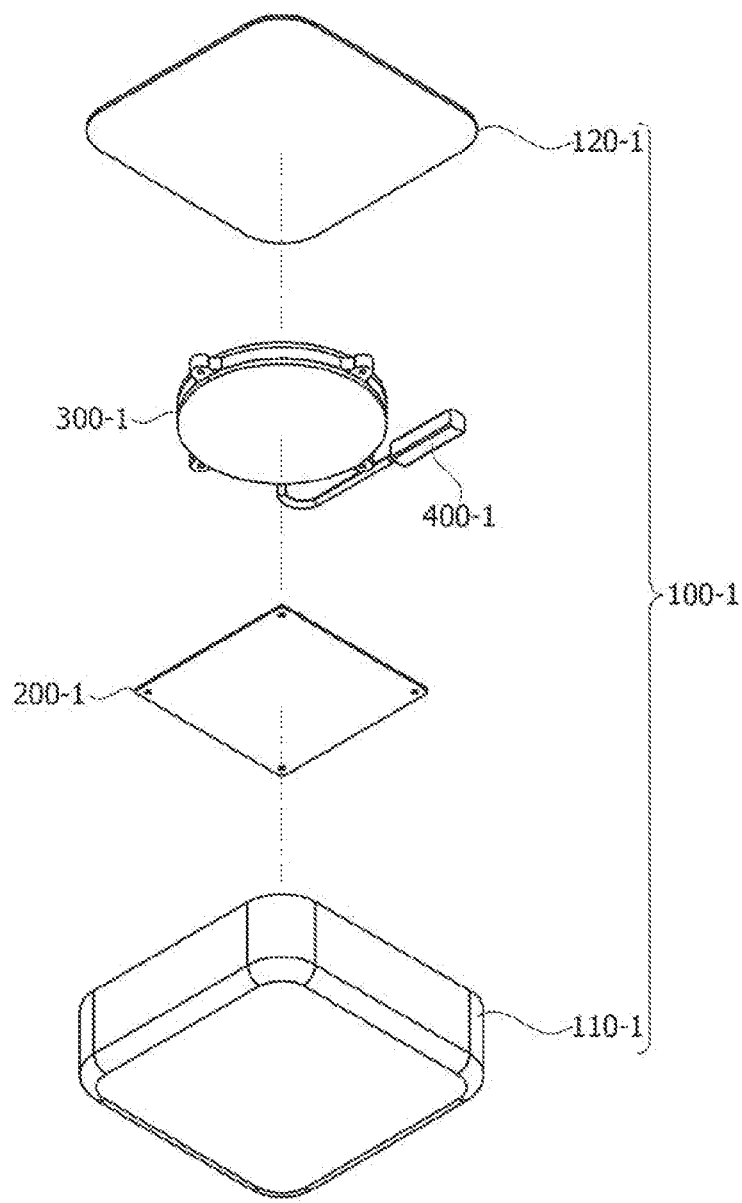

FIGS. 11A and 11B are exploded perspective views showing a radar device according to a fifth embodiment of the present invention.

Referring to FIGS. 11A and 11B, the radar device according to the fifth embodiment of the present invention may include a housing 100-1, an antenna 200-1, a radome 300-1, and a driving unit 400-1.

The housing 100-1 may include a first housing 110-1 and a second housing 120-1. The first housing 110-1 may have a space in which the antenna 200-1, the radome 300-1, and the driving unit 400-1 may be accommodated and have an open one side surface, and the second housing 120-1 may be coupled to the one side surface of the first housing 110-1.

The antenna 200-1 may be disposed on an inner bottom surface of the housing 110-1 and may radiate or receive electromagnetic waves. Although not shown, the antenna 200-1 may include a board and a radiation pattern formed on the board. Here, the board may be, for example, a PCB. The radiation pattern may be formed on one surface of the board and formed in any of various shapes for radiating electromagnetic waves.

The antenna 200-1 may include not only one radiation pattern but also a plurality of radiation patterns. The antenna 200-1 may include an antenna array including at least one antenna.

The radome 300-1 may be disposed above the antenna 200-1 and may have a shape changed by an external stimulus. The radome 300-1 may be transformed into a shape in which a FOV may be adjusted to increase or decrease according to situations, for example, a convex lens shape or a concave lens shape.

The radome 300-1 according to the embodiment describes a case of being formed in a circular shape as an example, but is not necessarily limited thereto and if necessary, may be formed in any of various shapes.

Figure 12A:
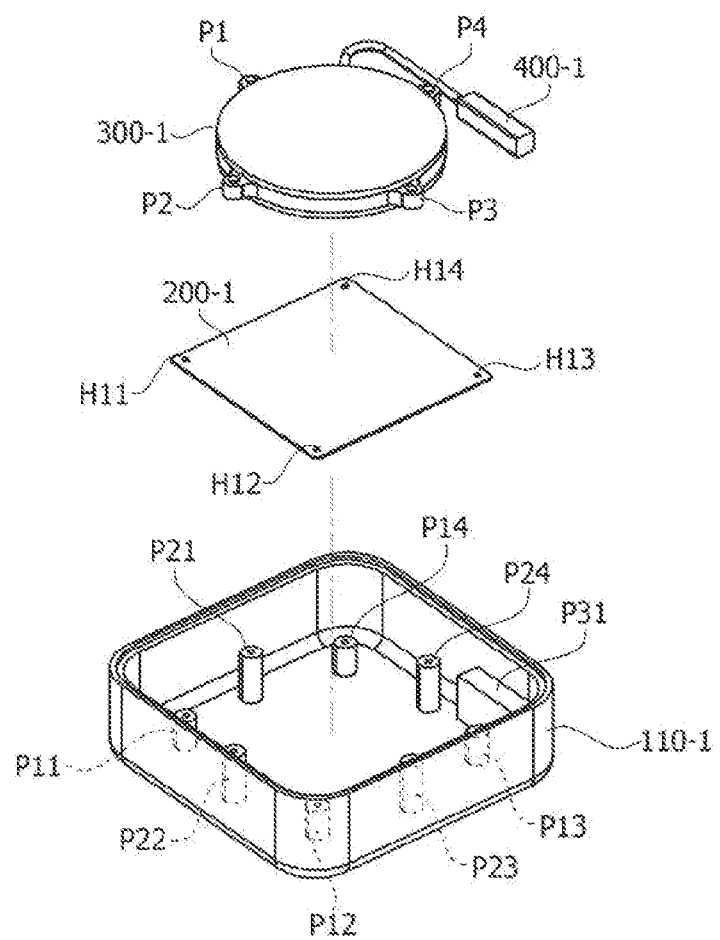
FIGS. 12A to 12C are views for describing the arrangement form of the radar device.
Figure 12B:
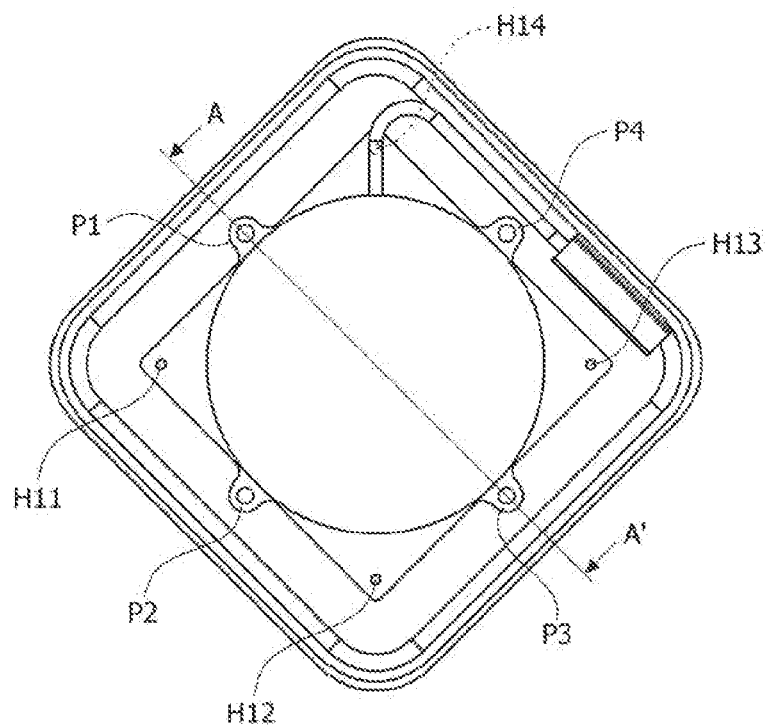
Figure 12C:
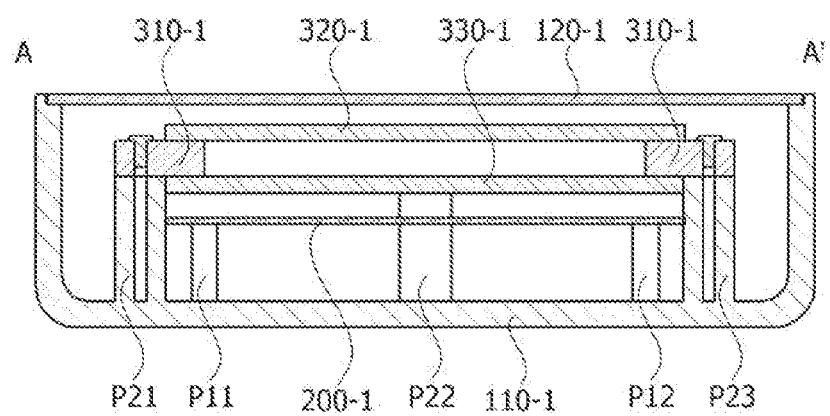

FIGS. 12A to 12C are views for describing the arrangement form of the radar device.

Referring to FIGS. 12A to 12C, a plurality of protrusions may be provided on the inner bottom surface of the first housing 110-1. The plurality of protrusions may include first protrusions P11, P12, P13, and P14, second protrusions P21, P22, P23, and P24, and a third protrusion P31.

The first protrusions P11, P12, P13, and P14 may be coupled to grooves H11, H12, H13, and H14 of the antenna 200 to support the antenna 200-1.

The second protrusions P21, P22, P23, and P24 may be coupled to protrusions P1, P2, P3, and P4 of the radome 300-1 to support the radome 300-1.

The third protrusion P31 may be coupled to the driving unit 400-1 to support the driving unit 400-1.

In this case, heights of the first protrusions P11, P12, P13, and P14 supporting the antenna may be formed to be lower than heights of the second protrusions P21, P22, P23, and P24, and heights of the second protrusions P21, P22, P23, and P24 may be formed to be equal to or higher than a height of the third protrusion P31.

Figure 13:
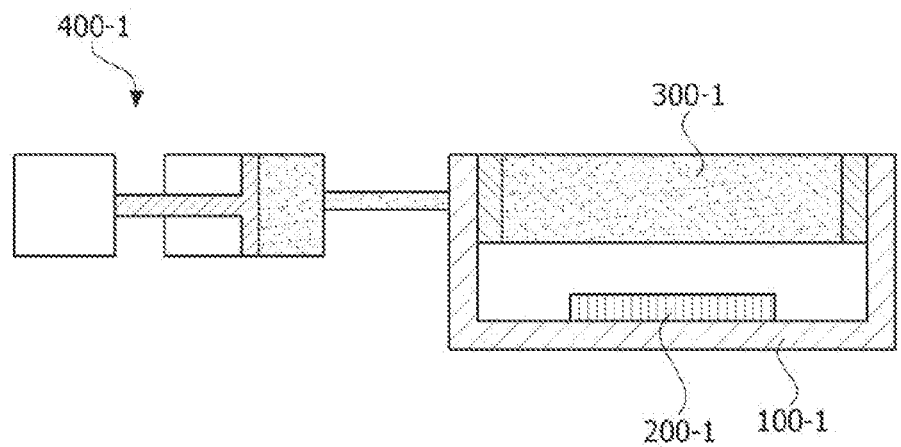
FIG. 13 is a view showing a radar device according to a sixth embodiment of the present invention.

FIG. 13 is a view showing a radar device according to a sixth embodiment of the present invention.

Referring to FIG. 13, the radar device according to the sixth embodiment of the present invention may include the antenna 200-1 and the radome 300-1 accommodated in the first housing 110-1, and the driving unit 400-1. Here, a cross-sectional structure of the radar device is a view showing the entire structure for convenience for description, and thus may differ from a cross-sectional structure of the radar devices in FIGS. 11A and 11B.

In this case, by driving the driving unit 400-1, one radome 300-1 may be transformed into the convex lens shape by expanding, or one radome 300-1 may be transformed into the concave lens shape by shrinking.

The inner space of the radome 300-1 may be filled with a liquid and may shrink or expand according to the amount of liquid. Here, as the liquid, a silicone liquid with a dielectric constant which is optimal to antenna performance can be used. In this case, the dielectric constant can be designed in the range of about 3 to 4 F/m at 80 GHz.

FIGS. 14A to 14D are views for describing a shape and operation principle of the radome shown in FIG. 11A.

Figure 14A:
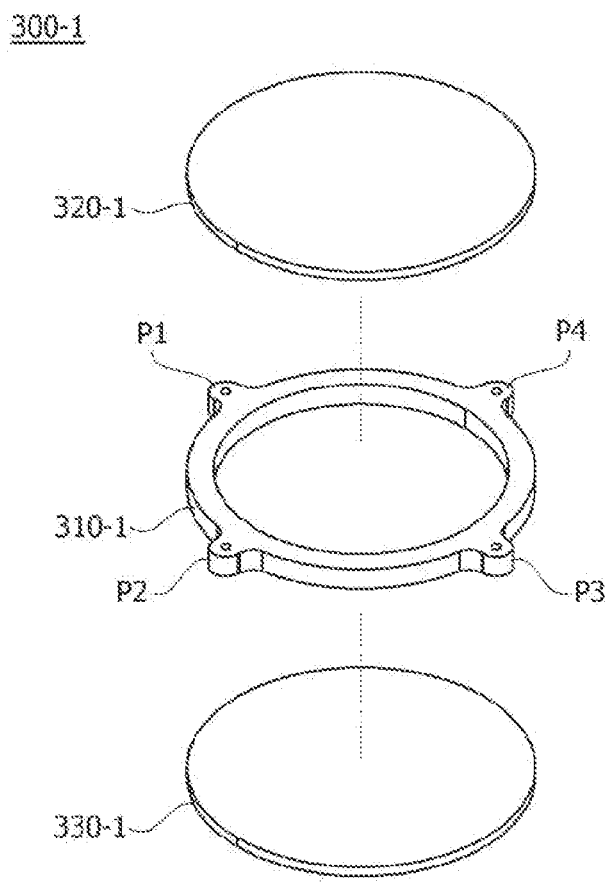
FIGS. 14A to 14D are views for describing a shape and operation principle of the radome shown in FIG. 11A.

Referring to FIG. 14A, the radome 300-1 according to the embodiment is a component for adjusting the sensing area by changing the focus of the antenna 200-1 and may include a fixing part 310-1, a first transformable part 320-1, and a second transformable part 330-1.

The fixing part 310-1 may be formed in a ring shape and provided with a plurality of protrusions P1, P2, P3, and P4 outside. The plurality of protrusions P1, P2, P3, and P4 may be coupled to the plurality of protrusions P21, P22, P23, and P24 formed on the inner bottom surface of the first housing 110-1 shown in FIG. 12A.

The first transformable part 320-1 may be coupled to one side surface of the fixing part 310-1, and the second transformable part 330-1 may be coupled to the other side surface of the fixing part 310-1 to form an enclosed space for accommodating the liquid. In this case, the first transformable part 320-1 and the second transformable part 330-1 may be coupled to the one side surface and the other side surface of the fixing part 310-1 using an adhesive, but are not necessarily limited thereto and may be fixed in any of various bonding methods such as ultrasonic waves fusion and sealant.

Figure 14B:
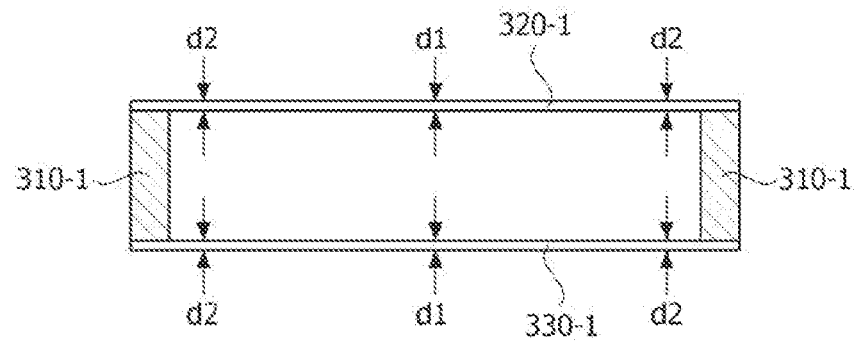

Shapes of the first transformable part 320-1 and the second transformable part 330-1 may be changed as the liquid is introduced or discharged. To this end, the first transformable part 320-1 and the second transformable part 330-1 may be formed of elastic members. The first transformable part 320-1 and the second transformable part 330-1 may be formed to have the same thickness as shown in FIG. 14B. In other words, a thickness d1 of a center portion and a thickness d2 of an edge portion may be formed equally.

Figure 14C:
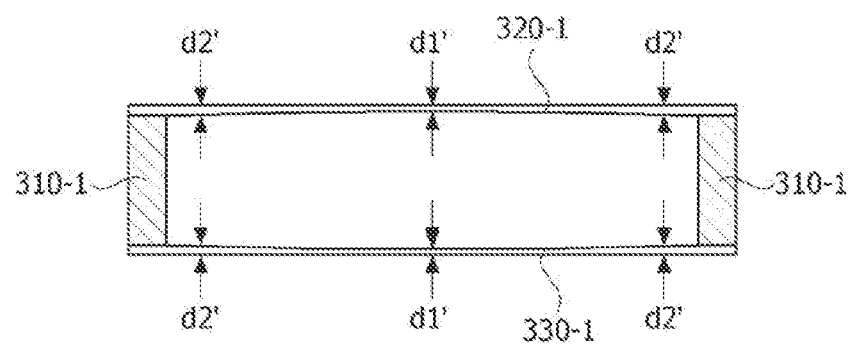

The first transformable portion 320-1 and the second transformable portion 330-1 may be formed to have different thicknesses according to positions as shown in FIG. 14C, and a thickness d1' may be formed to be relatively smaller at positions at which more transformation occurs, and a thickness d2' may be formed to be relatively greater at positions at which less transformation occurs.

In this case, the first transformable portion 320-1 and the second transformable portion 330-1 may be formed of elastic members such as silicone rubber or thermal plastic elastomer (TPE) rubber capable of shrinkage and expansion.

Figure 14D:
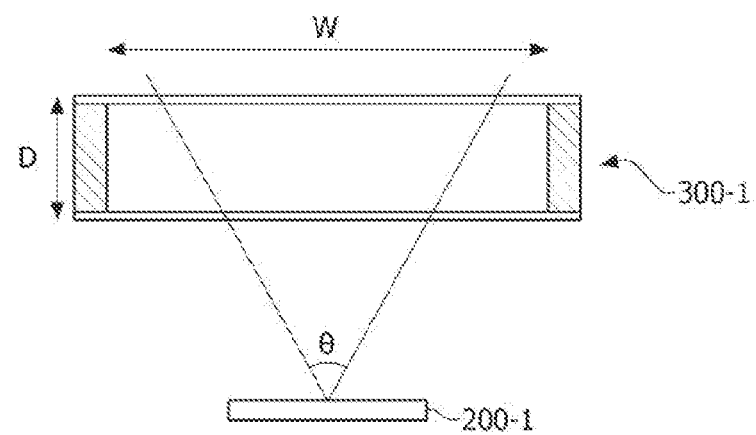

Referring to FIG. 14D, the radome 300-1 may be formed to have a predetermined width W and thickness D. A width of the radome 300-1 may be formed to be greater than a radiation angle θ of the antenna.

In this case, the width or diameter W of the radome 300-1 is preferably formed in the range of about 10 to 15 cm. A distance between the radome 300-1 and the antenna 200-1 can be designed considering the degree to which the radome 300-1 expands due to expansion of the radome 300-1 and is preferably set to about 2.5 to 5 mm.

Figure 15A:
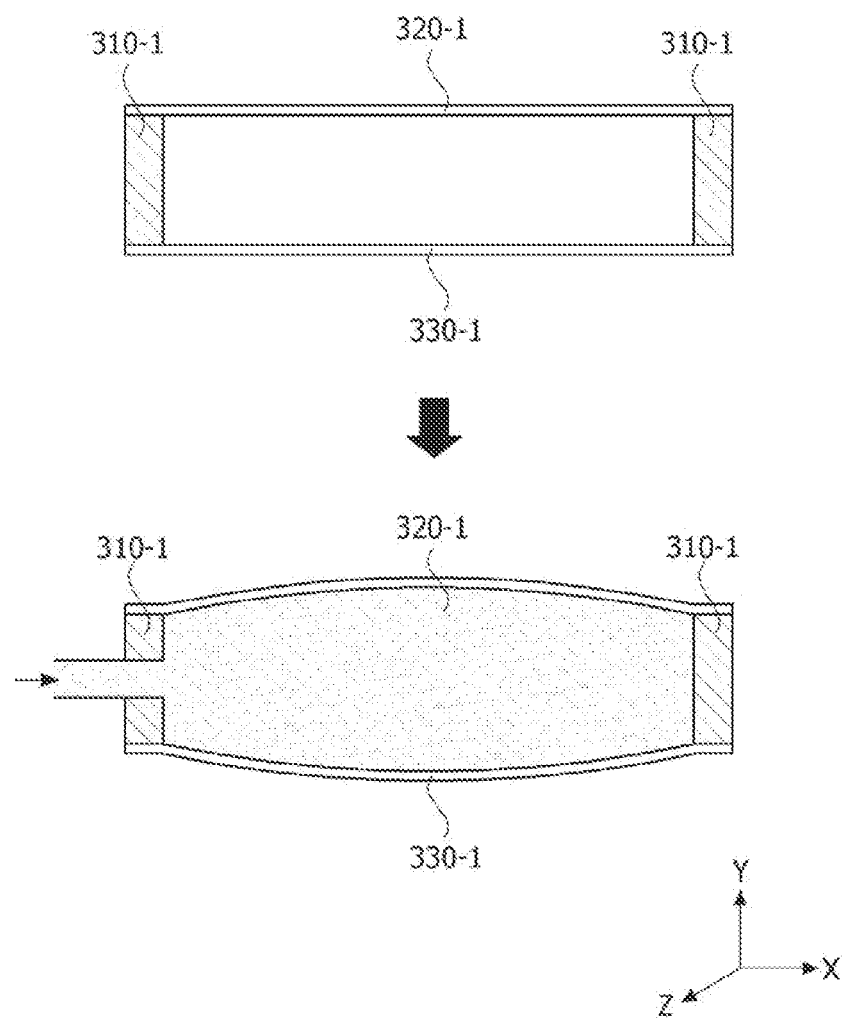
FIGS. 15A and 15B are views for describing a principle in which the shape of the radome is transformed.
Figure 15B:
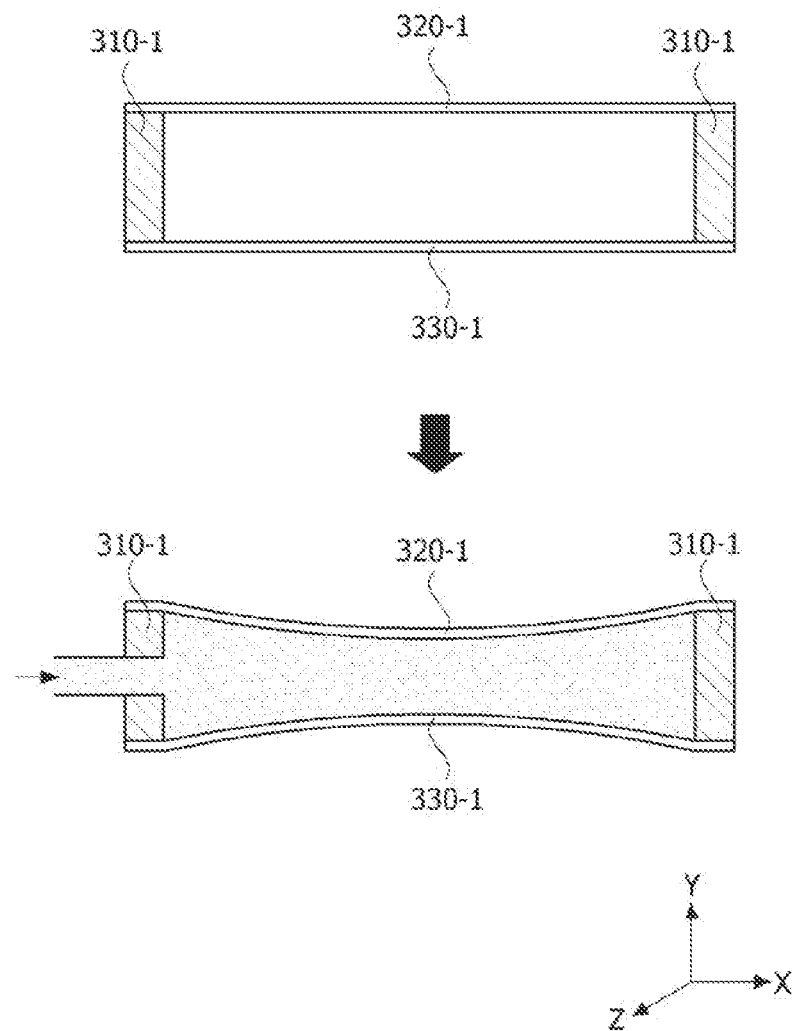

FIGS. 15A and 15B are views for describing a principle in which the shape of the radome is transformed.

Referring to FIG. 15A, a liquid may be accommodated in the inner space of the radome, and since the first transformable part 320-1 and the second transformable part 330-1 expand due to the introduction of the liquid in a non-transformed state, the radome may be transformed into the convex lens shape.

When the liquid is introduced according to the control signal for expanding to the wide area while sensing the predetermined reference area, the first transformable part 320-1 may expand in the first direction on the first axis and the second transformable part 330-1 may expand in the second direction on the first axis by the introduced liquid, and thus the radome may be transformed into the convex lens shape.

At this time, the transformation degrees of the first transformable part 320-1 and the second transformable part 330-1 may be changed depending on the amount of liquid introduced into the inner space of the radome. For example, as the amount of introduced liquid increases, the first transformable part 320-1 and the second transformable part 330-1 may be transformed greatly, and as the amount of introduced liquid decreases, the first transformable part 320-1 and the second transformable part 330-1 may be transformed slightly.

Referring to FIG. 15B, a liquid may be accommodated in the inner space of the radome, and since the first transformable part 320-1 and the second transformable part 330-1 shrink due to the discharge of the liquid in a non-transformed state, the radome may be transformed into the concave lens shape.

When the liquid is discharged according to the control signal for focusing on the narrow area while sensing the predetermined reference area, the first transformable part 320-1 may shrink in the second direction on the first axis and the second transformable part 330-1 may shrink in the first direction on the first axis by the discharged liquid, and thus the radome may be transformed into the concave lens shape.

Figure 16:
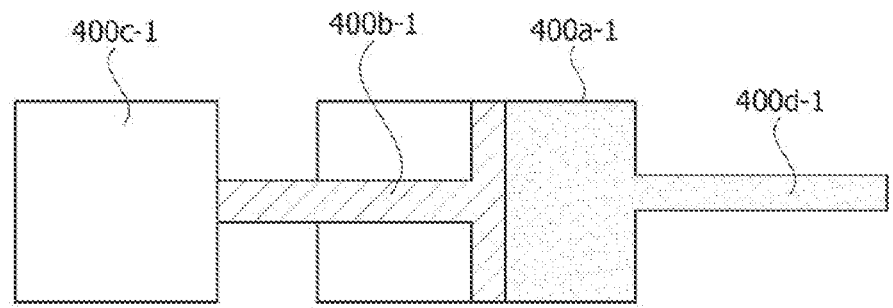
FIG. 16 is a view showing a specific configuration of the driving unit shown in FIG. 11A.

FIG. 16 is a view showing a specific configuration of the driving unit shown in FIG. 11A.

Referring to FIG. 16, the driving unit 400-1 according to the embodiment is a means for transforming the radome and may include an accommodating part 400a-1, a moving part 400b-1, a motor 400c-1, and a tube 400d-1.

The accommodating part 400a-1 may accommodate the liquid and have an inner space in which the amount of liquid may be adjusted. In other words, a portion of the liquid accommodated in the accommodating part 400a-1 flows into the radome to decrease the amount of liquid, or a portion of the liquid is introduced from the radome to increase the amount of liquid. In this case, the total amount of liquid accommodated in the accommodating part 400a-1 and the radome is the same without change.

The moving part 400b-1 may have one side into which the accommodating part 400a-1 is inserted to move in the first direction or move in the second direction on a center axis of the accommodating part 400a-1. As an example, when the moving part 400b-1 moves in the first direction, a pressure may increase to transfer the liquid accommodated in the accommodating part 400a-1 to the radome. As another example, when the moving part 400b-1 moves in the second direction, the pressure may decrease to transfer the liquid in the radome to the accommodating part 400a-1.

The motor 400c-1 may be connected to the moving part 400b-1 to move the moving part 400b-1. The motor 400c-1 can be implemented as, for example a linear motor, but is not necessarily limited thereto.

The tube 400d-1 may be coupled to the other side of the accommodating part 400a-1 and connected to the inner space of the radome. The tube 400c-1 is a means for transferring the liquid and may transfer the liquid in the inner space of the accommodating part 400a-1 to the inner space of the radome or transfer the liquid in the inner space of the radome to the inner space of the accommodating part 400a-1.

Figure 17A:
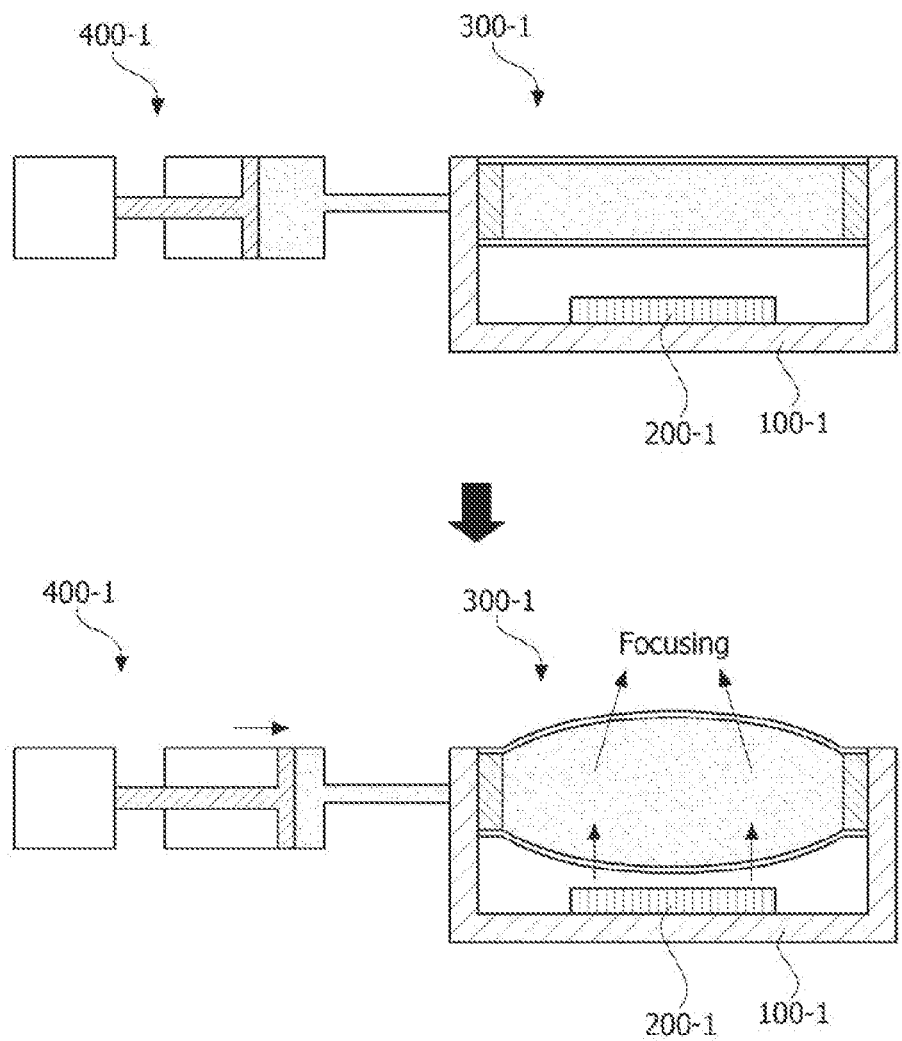
FIGS. 17A and 17B are views for describing an operation principle of the radar device according to the embodiment.
Figure 17B:
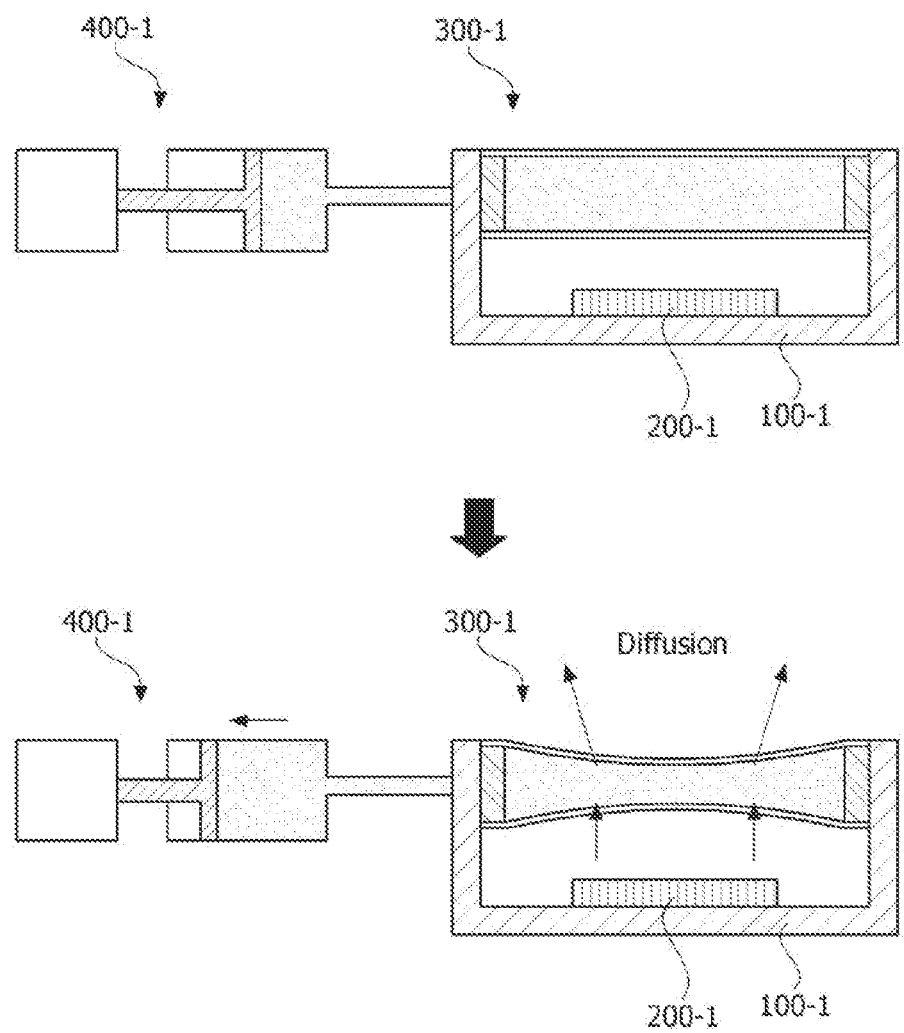

FIGS. 17A and 17B are views for describing an operation principle of the radar device according to the embodiment.

Referring to FIG. 17A, in the radar device according to the embodiment, when the liquid flows into the inner space of the radome by driving the driving unit according to the control signal for focusing on the narrow area while sensing the predetermined reference area, the radome may be transformed into the convex lens shape by expanding.

For example, when a situation in which a specific area needs to be focused while sensing the predetermined reference area occurs, the radar device may transform the radome into the convex lens shape.

Referring to FIG. 17B, in the radar device according to the embodiment, when the liquid is discharged into the inner space of the radome by driving the driving unit according to the control signal for expanding to the wide area while sensing the predetermined reference area, the radome may be transformed into the concave lens shape by shrinking.

For example, when a situation in which the wide area needs to be focused broadly while sensing the predetermined reference area occurs, the radar device may transform the radome into the concave lens shape.

Figure 18:
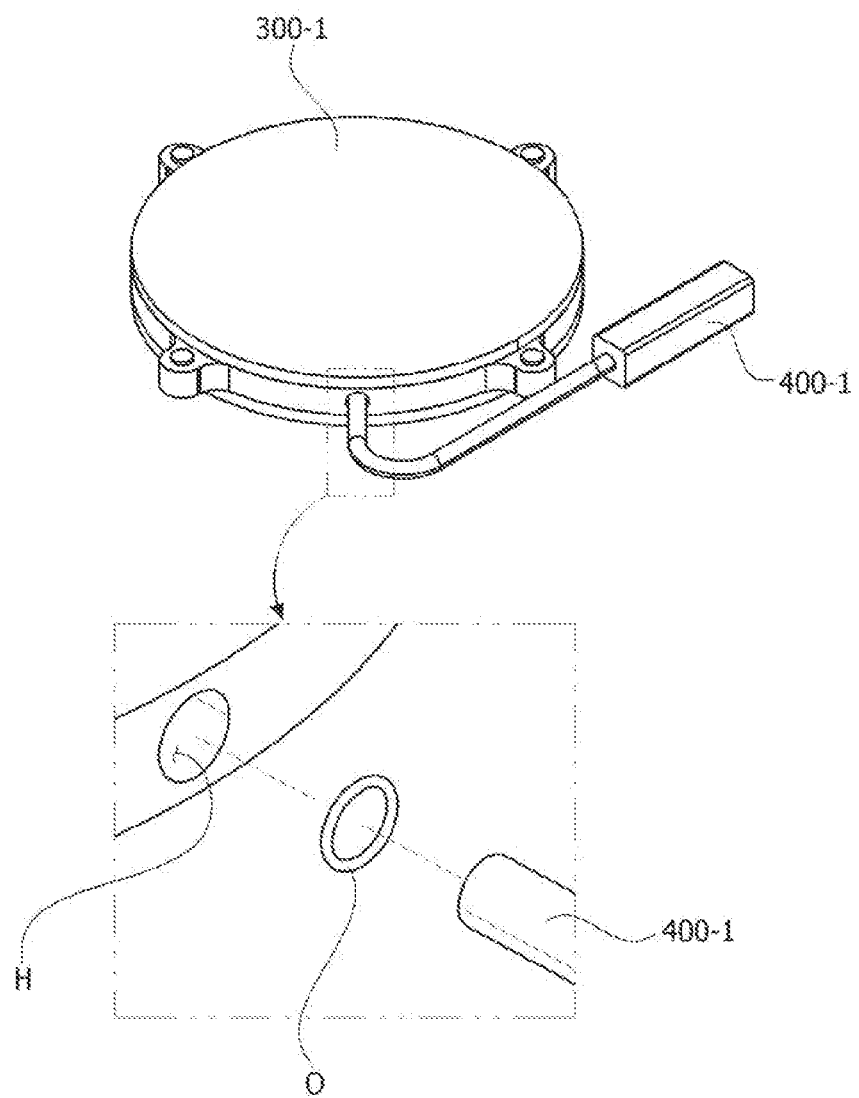
FIG. 18 is a view showing the connection relationship between the radome and the driving unit according to the embodiment.

FIG. 18 is a view showing the connection relationship between the radome and the driving unit according to the embodiment.

Referring to FIG. 18, the inner space of the radome and the driving unit may be connected so that a liquid may be introduced or discharged. In this case, since the liquid may be discharged to the outside when the radome and the driving unit are connected, the radome and the driving unit need to be completely sealed. Therefore, in an embodiment, when a hole H of the radome and the tube of the driving unit are coupled, the hole H of the radome and the tube of the driving unit may be processed to be completely sealed using an O-ring O. In this case, not only one O-ring but also a plurality of O-rings can be used.

Additionally, a portion in which the hole of the radome and the tube of the driving unit are coupled may be processed to be sealed with sealant.

In addition, although not shown, to further maximize the sealing effect, a coupling groove may be formed inside the groove, and a coupling protrusion may be formed at an end portion of the tube of the driving unit so that the coupling groove and the coupling protrusion are engaged. Here, one example for sealing is merely described, and the present invention is not necessarily limited thereto.

Figure 19:
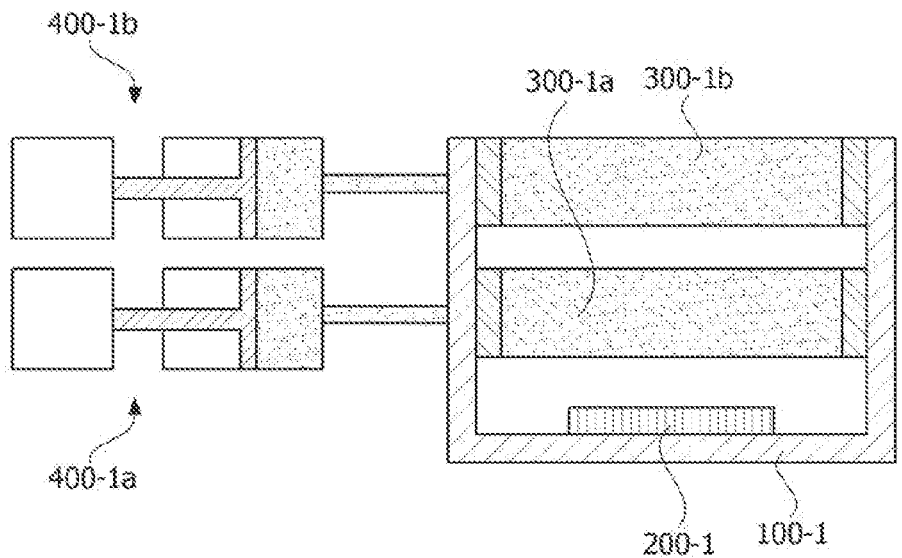
FIG. 19 is a view showing a radar device according to a seventh embodiment of the present invention.

FIG. 19 is a view showing a radar device according to a seventh embodiment of the present invention.

Referring to FIG. 19, the radar device according to the seventh embodiment of the present invention may include the antenna 200-1, a first radome 300-1a, and a second radome 300-1b accommodated in the first housing 110-1, a first driving unit 400-1a, and a second driving unit 400-1b.

In this case, the first and second radomes 300-1a and 300-1b may be transformed by driving the first and second driving units 400-1a and 400-1b, respectively. Here, although a case in which two radomes and driving units are implemented is described as an example, the present invention is not necessarily limited thereto, and three or more radomes and driving units can also be implemented.

In this case, the plurality of radomes may be transformed together into the same shape, that is, a block lens shape or a concave lens shape, but are not necessarily limited thereto and may be transformed into other shapes.

As an example, the first radome 300-1a and the second radome 300-1b may be transformed into a convex lens shape or a concave lens shape in the same manner.

As another example, since the first radome 300-1a is transformed into a convex lens shape and the second radome 300-1b is transformed into a concave lens shape, or the first radome 300-1a is transformed into a concave lens shape and the second radome 300-1b is transformed into a concave lens shape, the first radome 300-1a may differ from the second radome 300-1b.

Figure 20:
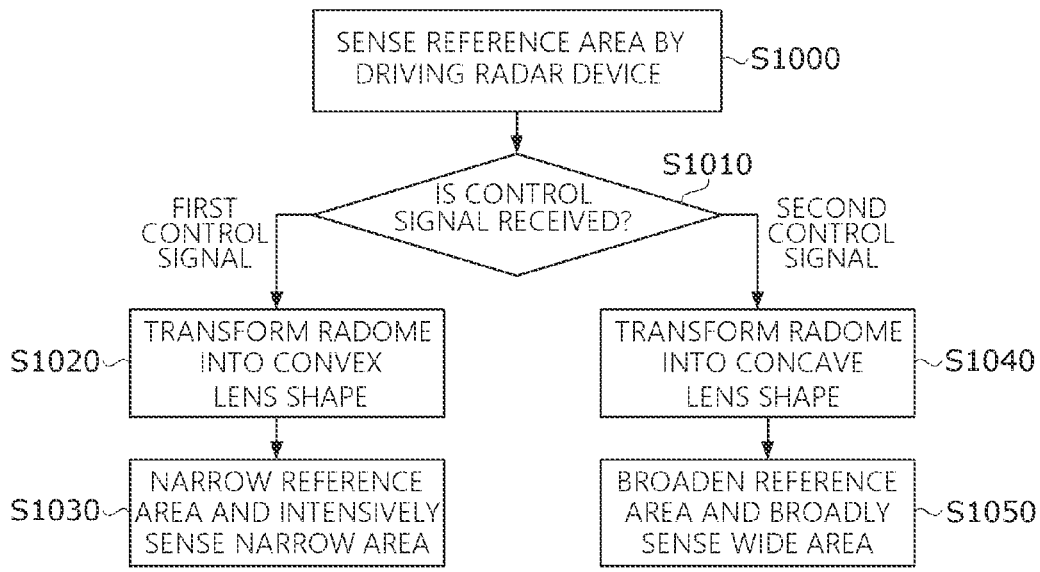
FIG. 20 is a view showing a method of driving the radar device according to the embodiment of the present invention.

FIG. 20 is a view showing a method of driving the radar device according to the embodiment of the present invention.

Referring to FIG. 20, the radar device according to the embodiment of the present invention may be driven according to the user's menu or key manipulation to sense an object the predetermined reference area (S1010).

Next, the radar device may receive a control signal, that is, a first control signal or a second control signal for adjusting the reference area when the user's manipulation is performed or a predetermined condition is satisfied (S2010).

Next, when the radar device receives the first control signal, the radome may be transformed into a block lens shape by expanding (S2020), thereby narrowing the reference area and intensively sensing the narrow area (S2030).

Next, when the radar device receives the second control signal, the radome may be transformed into a concave lens shape by shrinking (S2040), thereby broadening the reference area and broadly sensing the wide area (S2050).

Although the above description has been made with reference to the exemplary embodiments of the present invention, those skilled in the art will be able to understand that the present invention can be variously modified and changed without departing from the spirit and scope of the present invention described in the appended claims.

DESCRIPTION OF REFERENCE NUMERALS 100, 100-1: housing
200, 200-1: antenna
300, 300-1: radome
400, 400-1: driving unit

The invention claimed is:

1. A radar device comprising:
an antenna;
a radome disposed above the antenna and having a shape changed by an external stimulus; and
a driving unit connected to at least one side of the radome to apply the external stimulus to the at least one side of the radome according to a predetermined control signal,
wherein the radome is shrinked by an external stimulus applied in a first direction on the center axis, and expanded by an external stimulus applied in a second direction opposite to the first direction.

2. The radar device of claim 1, wherein the radome includes:
a fixing part; and
a transformable part coupled to the fixing part and having a shape changed in a second axis direction perpendicular to a first axis direction as the fixing part moves in the first axis direction.

3. The radar device of claim 2, wherein a length of the transformable part is formed to be greater than a radiation angle of the antenna.

4. The radar device of claim 2, wherein the transformable part is made of an auxetic material.

5. The radar device of claim 2, wherein the fixing part includes a first fixing part and a second fixing part,
the driving unit includes a first driving unit and a second driving unit,
the first fixing part is moved in the first axis direction by the first driving unit, and
the second fixing part is moved in the first axis direction by the second driving unit.

6. The radar device of claim 1, wherein the driving unit includes:

a coupling part fixed to one side of the radome;
a moving unit connected to the coupling part; and
an actuator configured to rotate the moving unit in a first direction or a second direction.

7. The radar device of claim 6, wherein the driving unit allows a predetermined liquid for an external stimulus to flow into or discharged from an inner space of the radome according to the predetermined control signal.

8. The radar device of claim 7, wherein the radome includes:
a fixing part;
a first transformable part fixedly coupled to one side surface of the fixing part; and
a second transformable part fixedly coupled to the other side surface of the fixing part.

9. The radar device of claim 8, wherein the first transformable part and the second transformable part are formed of elastic members with a predetermined elastic force.

10. The radar device of claim 8, wherein lengths of the first transformable part and the second transformable part are greater than a radiation angle of the antenna.

11. The radar device of claim 6, wherein the radome is transformed into a convex lens shape by expanding as the liquid is introduced and transformed into a concave lens shape by shrinking as the liquid is discharged.

12. The radar device of claim 6, wherein the driving unit includes:
a tube coupled to one side of the radome;
an accommodating part having one side connected to the tube and filled with a predetermined amount of liquid;
a moving part inserted into the other side of the accommodating part and configured to move along a center axis of the accommodating part; and
a motor configured to move the moving part in the first direction or the second direction on the center axis.

13. The radar device of claim 3, wherein the transformable part is made of an auxetic material.

14. The radar device of claim 3, wherein the fixing part includes a first fixing part and a second fixing part,
the driving unit includes a first driving unit and a second driving unit,
the first fixing part is moved in the first axis direction by the first driving unit, and
the second fixing part is moved in the first axis direction by the second driving unit.

15. The radar device of claim 9, wherein lengths of the first transformable part and the second transformable part are greater than a radiation angle of the antenna.

16. The radar device of claim 7, wherein the radome is transformed into a convex lens shape by expanding as the liquid is introduced and transformed into a concave lens shape by shrinking as the liquid is discharged.

17. The radar device of claim 8, wherein the radome is transformed into a convex lens shape by expanding as the liquid is introduced and transformed into a concave lens shape by shrinking as the liquid is discharged.

18. The radar device of claim 9, wherein the radome is transformed into a convex lens shape by expanding as the liquid is introduced and transformed into a concave lens shape by shrinking as the liquid is discharged.

19. The radar device of claim 7, wherein the driving unit includes:
a tube coupled to one side of the radome;
an accommodating part having one side connected to the tube and filled with a predetermined amount of liquid;
a moving part inserted into the other side of the accommodating part and configured to move along a center axis of the accommodating part; and
a motor configured to move the moving part in the first direction or the second direction on the center axis.

20. The radar device of claim 8, wherein the driving unit includes:
a tube coupled to one side of the radome;
an accommodating part having one side connected to the tube and filled with a predetermined amount of liquid;
a moving part inserted into the other side of the accommodating part and configured to move along a center axis of the accommodating part; and
a motor configured to move the moving part in the first direction or the second direction on the center axis.

* * * * *